US008803842B2

(12) United States Patent
Wakasugi et al.

(10) Patent No.: US 8,803,842 B2
(45) Date of Patent: Aug. 12, 2014

(54) TOUCH PANEL APPARATUS AND METHOD FOR DETECTING DISTANCE BETWEEN TOUCH INPUT POINTS ON TOUCH PANEL

(75) Inventors: Junichi Wakasugi, Tokyo (JP); Kaichin Li, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 105 days.

(21) Appl. No.: 13/511,027

(22) PCT Filed: Nov. 26, 2010

(86) PCT No.: PCT/JP2010/006910
§ 371 (c)(1),
(2), (4) Date: May 21, 2012

(87) PCT Pub. No.: WO2011/065011
PCT Pub. Date: Jun. 3, 2011

(65) Prior Publication Data
US 2012/0262417 A1    Oct. 18, 2012

(30) Foreign Application Priority Data

Nov. 26, 2009 (JP) ................................. 2009-269081
Dec. 14, 2009 (JP) ................................. 2009-283023

(51) Int. Cl.
G06F 3/045    (2006.01)
(52) U.S. Cl.
USPC .......................... 345/174; 345/173; 178/18.01
(58) Field of Classification Search
USPC ................. 345/173, 174; 178/18.01
See application file for complete search history.

(56) References Cited

U.S. PATENT DOCUMENTS

2003/0189552 A1* 10/2003 Chuang et al. ................. 345/173
2009/0189877 A1*  7/2009 Washino et al. ............... 345/174

FOREIGN PATENT DOCUMENTS

| JP | 8-161099     | 6/1996 |
| JP | 09-44308 A   | 2/1997 |
| JP | 2000-056914 A| 2/2000 |
| JP | 2009-048233  | 3/2009 |
| JP | 2009146191 A | 7/2009 |
| JP | 2009-176114  | 8/2009 |
| JP | 2011-123815  | 6/2011 |
| JP | 2011-134316  | 7/2011 |

OTHER PUBLICATIONS

Korean Office Action dated Jul. 30, 2013 for the corresponding Korean Patent Application No. 10-2012-7008974.

(Continued)

*Primary Examiner* — Amare Mengistu
*Assistant Examiner* — Premal Patel
(74) *Attorney, Agent, or Firm* — Morgan, Lewis & Bockius LLP

(57) ABSTRACT

There are provided a touch panel apparatus and a method for detecting a distance between touch input points of a touch panel, with which it is possible to detect the distance between two points with accuracy, when two points are touched on the touch panel. Whether or not two points are touched on the touch panel TP is determined based upon a resistance value between terminals opposing each other. When it is determined that two points are touched, the distances between touched two points XDual and YDual are detected. In this situation, the distances between touched two points XDual and YDual are detected based upon the resistance value of the opposing terminals and a pressing force (contact resistance value) of the touch input points.

5 Claims, 24 Drawing Sheets

(56) References Cited

OTHER PUBLICATIONS

PCT/IB/338 dated Jul. 12, 2012 for corresponding application PCT/JP2010/006910.

PCT/IB/373 dated Jul. 4, 2012 for corresponding application PCT/JP2010/006910.
Japanese Office Action dated Jun. 4, 2013 for corresponding International Application No. 2009-283023.
Japanese Office Action dated Jan. 14, 2014.

* cited by examiner

CONTACT RESISTANCE VALUE/RESISTANCE VALUE IN X DIRECTION OF PANEL

FIG. 12
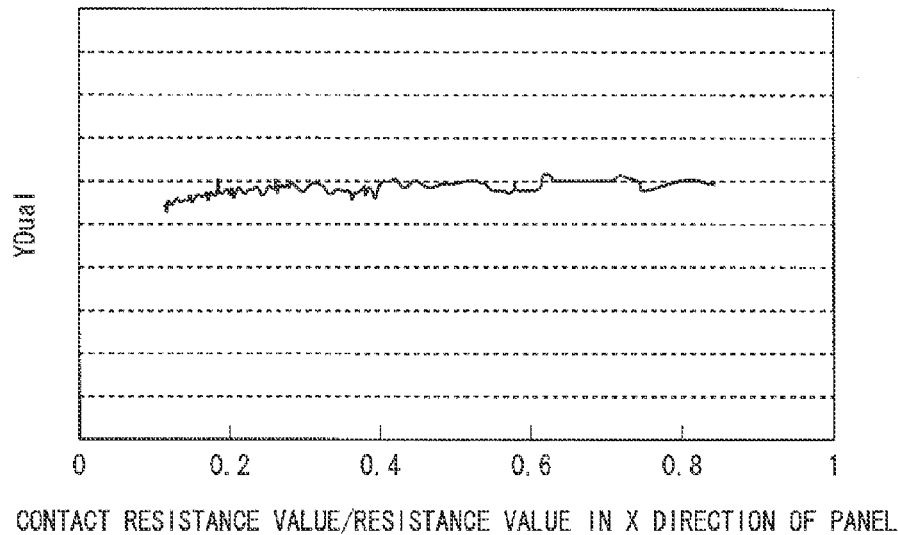
CONTACT RESISTANCE VALUE/RESISTANCE VALUE IN X DIRECTION OF PANEL
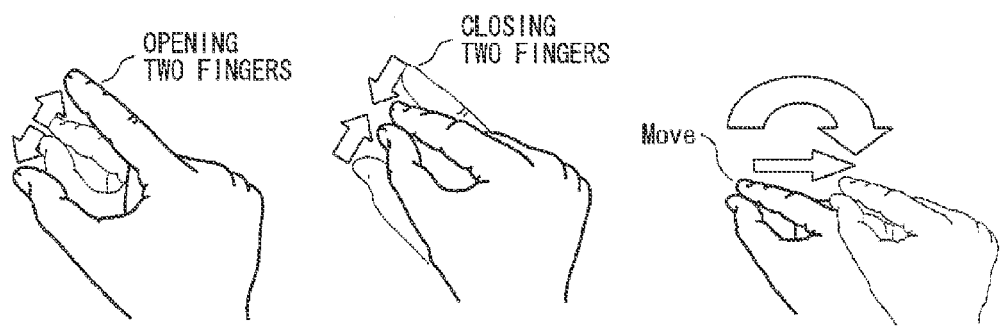
FIG. 13A
SCALING-UP
FIG. 13B
SCALING-DOWN
FIG. 13C
ROTATION F I G. 23
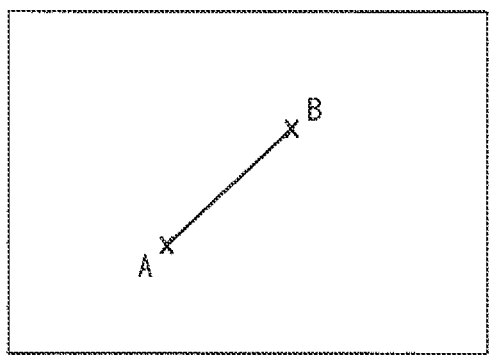

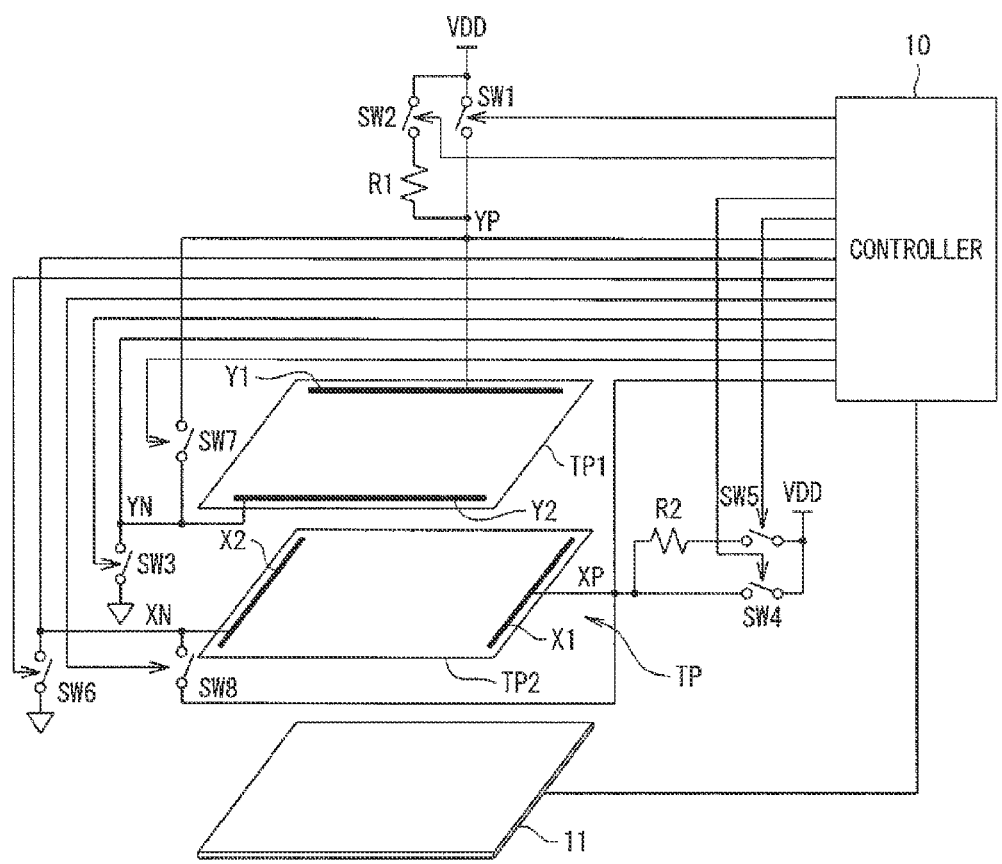
F I G. 25

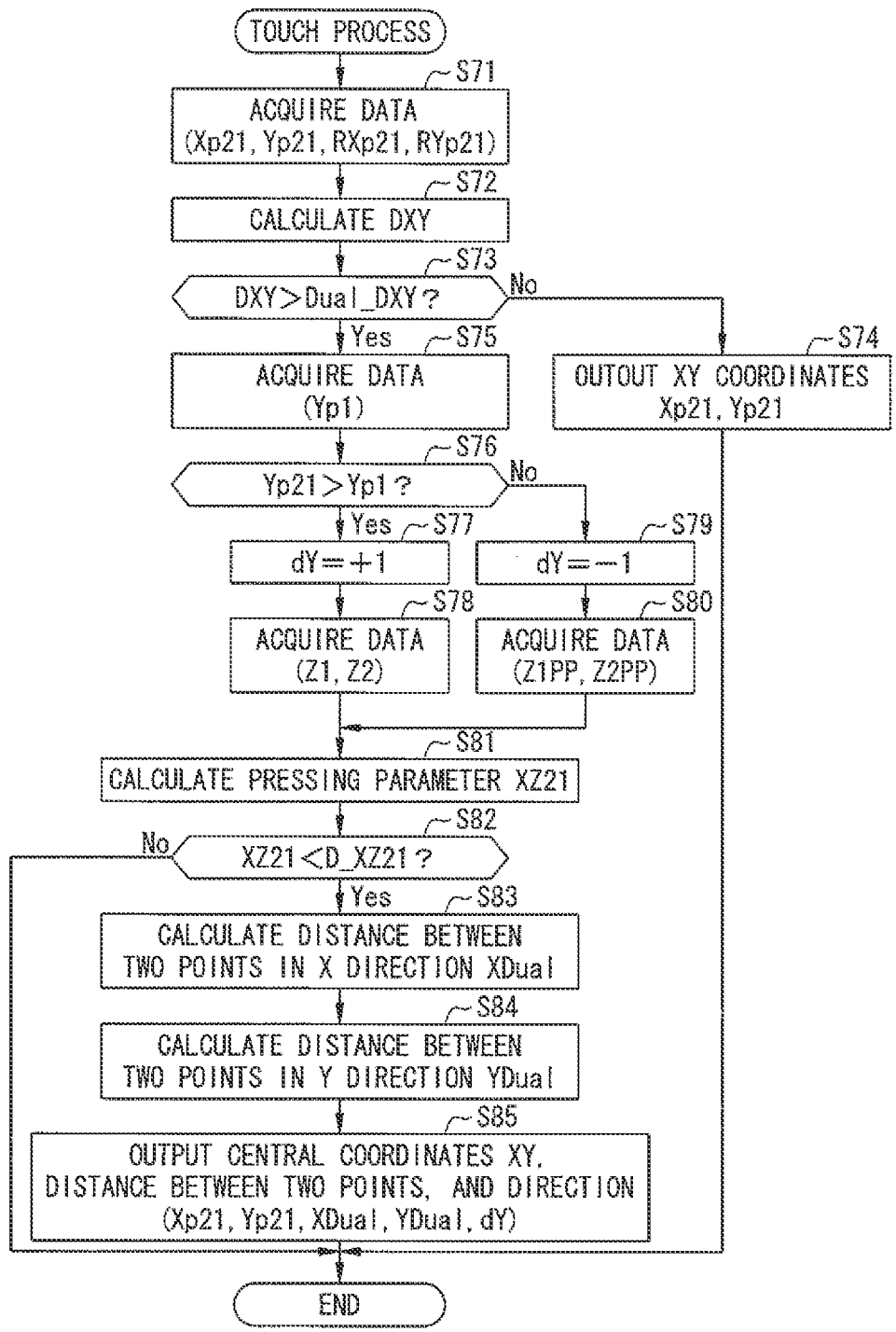
F I G. 31

F I G. 32
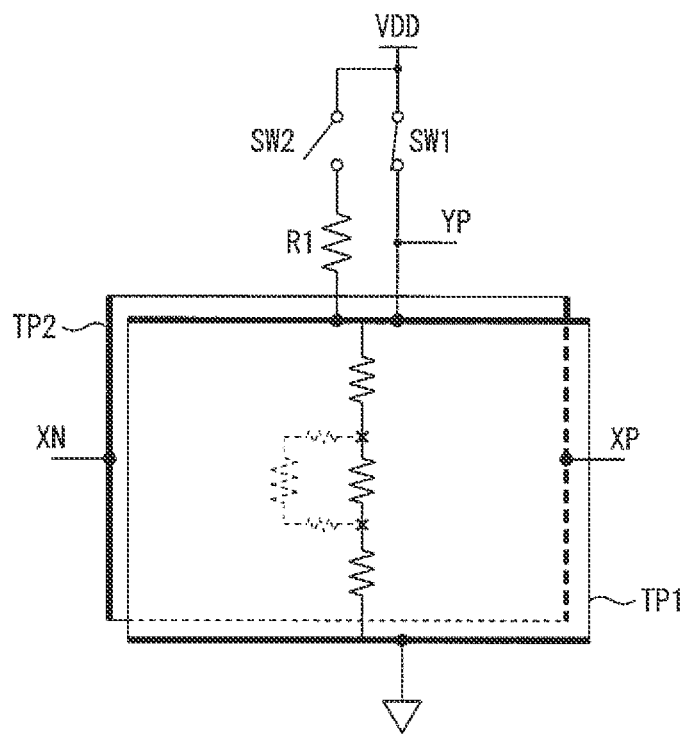

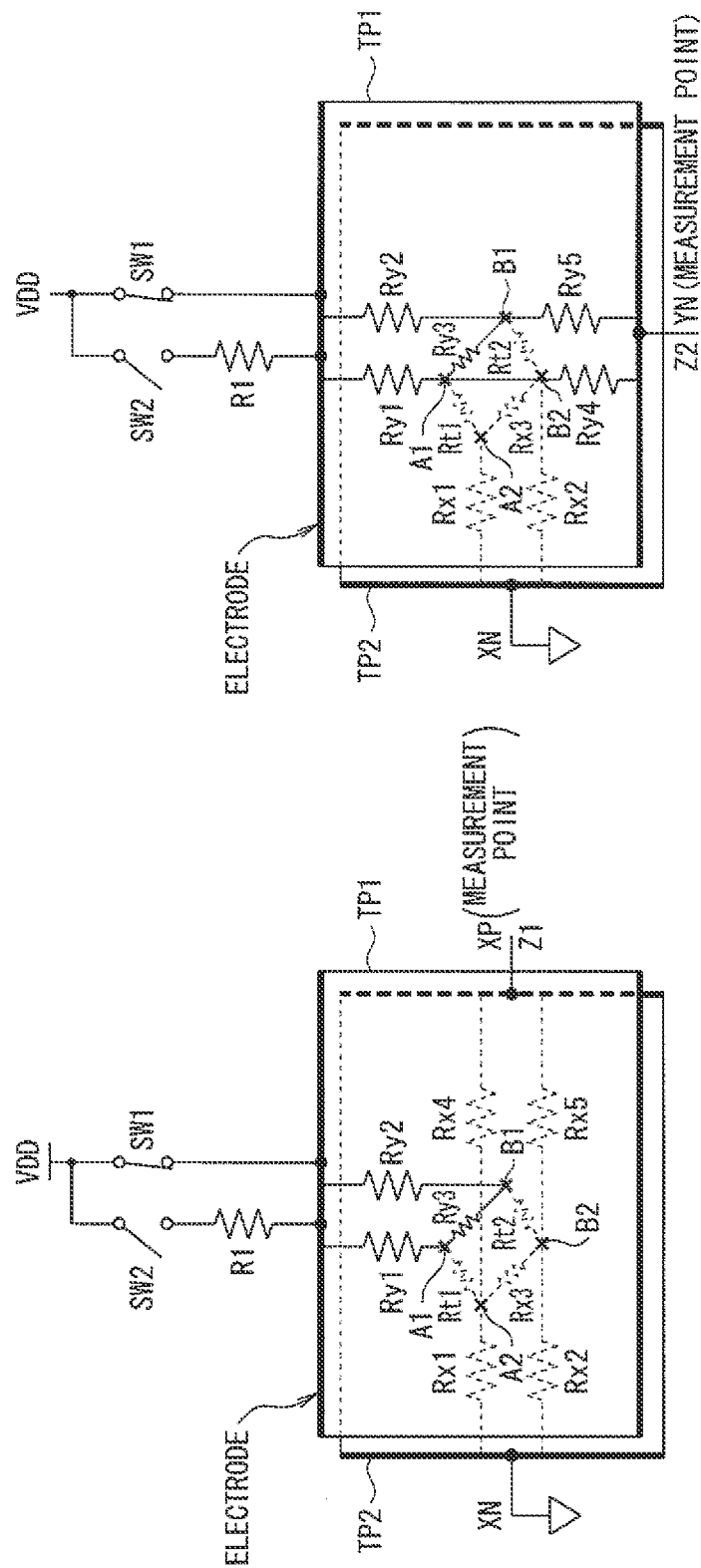

TOUCH PANEL APPARATUS AND METHOD FOR DETECTING DISTANCE BETWEEN TOUCH INPUT POINTS ON TOUCH PANEL

The present application is the national stage application of PCT/JP2010/006910, filed Nov. 26, 2010, which claims priority to Japanese Patent Application Numbers 2009-269081, filed Nov. 26, 2009, and 2009-283023, filed Dec. 14, 2009, the contents of which are incorporated herein by reference.

TECHNICAL FIELD

The present invention relates to a touch panel apparatus and a method for detecting a distance between touch input points on a touch panel, in particular, to a touch panel apparatus with the use of a resistance film capable of detecting a distance between two points when the two points are simultaneously touched and a method for detecting the distance between the two points.

BACKGROUND ART

As a conventional touch panel apparatus, an example is a technique described in Patent Document 1. In this technique, when two points are touched on a touch panel, such two-point touch is determined by use of a phenomenon in which a resistance value between terminals opposing each other arranged on a two-layered touch panel.

Here, the distances between the two points in X direction and Y direction are detected respectively by use of the fact that the resistance value between the terminals opposing each other is decreased, as the distance between the two points is longer when they are touched, based upon a resistance value between the terminals in X direction and a resistance value between the terminals in Y direction.

PRIOR ART DOCUMENTS

Patent Documents

Patent Document 1: JP 2009-176114 A

SUMMARY OF THE INVENTION

Problem to be Solved

It is to be noted that, however, the resistance value of the opposing terminals is influenced by not only the distance between the two points but also the pressing forces of the touch input points. That is, even if the distances between the two points are the same, the different pressing forces at the touch input points will change the resistance values between the opposing terminals.

Hence, an accurate distance between the two points cannot be figured out in the method of simply detecting the distance between the two points based upon the resistance value between the opposing terminals, as described in the touch panel apparatus of the above Patent Document 1. An operation against the operator's intention might be recognized.

Therefore, an object of the present invention is to provide a touch panel apparatus and a method for detecting a distance between touch input points on a touch panel, with which a distance between two points can be detected with accuracy, when the two points are touched on the touch panel.

In order to achieve the above object, according to a first aspect of a touch panel apparatus of the present invention, there is provided a touch panel apparatus comprising: a touch panel having two resistance films, each having a pair of electrode terminals at edge side portions opposing each other, the two resistance films closely opposing each other to be capable of being in contact with each other so that the pair of electrode terminals are vertically perpendicular to each other; a between-terminal resistance measuring unit for measuring a resistance value of the pair of electrode terminals; a two-point touch determining unit for determining whether or not two points are touched on the touch panel based upon the resistance value measured by the between-terminal resistance measuring unit; a pressing force detector for detecting a pressing force of a touch input when the two-point touch determining unit determines that the two points are touched; and a two-point distance detector for detecting a distance between the two points based upon the resistance value measured by the between-terminal resistance measuring unit and the pressing force measured by the pressing force detector, when the two-point touch determining unit determines that the two points are touched.

As described above, the distance between two points that have been touched is detected in consideration of the pressing force of the touch input. Accordingly, for example, when an operator touches two points, even in a case where the operation is performed to change the pressing force gradually from the touch starting time with the distance between two points being constant, it is possible to detect the distance between two points appropriately. It is thus possible to calculate the distance between two points with accuracy.

In addition, according to a second aspect of the present invention, the two-point distance detector may comprise: a reference value calculating unit for calculating a reference value of the distance between the two points based upon a difference between the resistance value measured by the between-terminal resistance measuring unit when the touch panel is not touched and the resistance value measured by the between-terminal resistance measuring unit when the touch panel is touched; and a correcting unit for correcting to increase the reference value of the distance between the two points calculated by the reference value calculating unit, as the pressing force detected by the pressing force detector is smaller.

By correcting the difference between the resistance value between the terminals when the touch panel is not touched and the difference between the resistance value between the terminals when the touch panel is touched, according to the pressing force of the touch input, it is made possible to correct the change amount of the contact resistance between the upper and lower resistance films at the pressing point generated in accordance with a change in the pressing force of the touch input.

As the pressing force is smaller, the contact resistance between the upper and lower resistance films is greater. Therefore, even if the distances between two points are same, the difference between the resistance value between the terminals when the touch panel is not touched and the resistance value between the terminals when the touch panel is touched, that is the reference value of the distance between two points is smaller. Accordingly, the reference value between the two points is additionally corrected as the pressing force is smaller. It is therefore possible to calculate the distance between two points with accuracy. In this manner, correction is enabled appropriately with a relatively simple configuration.

Furthermore, according to a third aspect of the present invention, there is provided a touch panel apparatus comprising: a touch panel composed of two resistance films, each having a pair of electrode terminals at edge side portions opposing each other, the two resistance films closely opposing each other to be capable of being in contact with each other so that the pair of electrode terminals are vertically perpendicular to each other; a first voltage detector for, with a power-supply voltage being applied between the pair of the electrode terminals of one of the resistance films and with the pair of the electrode terminals of the other of the resistance films being short-circuited, detecting a voltage of any one of the pair of electrode terminals of the other of the resistance films; a second voltage detector for, with a power-supply voltage being applied, through a resistance, between the pair of the electrode terminals of one of the resistance films and with the pair of the electrode terminals of the other of the resistance films being short-circuited, detecting a voltage of any one of the pair of electrode terminals of the other of the resistance films; a two-point touch determining unit for determining whether or not two points are touched on the touch panel based upon a ratio of the voltage detected by the first voltage detector and the voltage detected by the second voltage detector; a pressing force detector for detecting a pressing force of a touch input when the two-point touch determining unit determines that the two points are touched; and a two-point distance detector for detecting a distance between the two points based upon the ratio of the voltage detected by the first voltage detector and the voltage detected by the second voltage detector, and the pressing force measured by the pressing force detector, when the two-point touch determining unit determines that the two points are touched.

As described above, the distance between two points that have been touched is detected in consideration of the pressing force of the touch input. Accordingly, for example, when an operator touches two points, even in a case where the operation is performed to change the pressing force gradually from the touch starting time with the distance between two points being constant, it is possible to detect the distance between two points appropriately. It is thus possible to calculate the distance between two points with accuracy.

Moreover, according to a fourth aspect of the present invention, the two-point distance detector may comprise: a reference value calculating unit for calculating a reference value of the distance between the two points based upon a difference between the ratio of the voltage detected by the first voltage detector and the voltage detected by the second voltage detector when one point is touched on the touch panel, and the ratio of the voltage detected by the first voltage detector and the voltage detected by the second voltage detector when the two points are touched on the touch panel; and a correcting unit for correcting to increase the reference value of the distance between the two points calculated by the reference value calculating unit, as the pressing force detected by the pressing force detector is smaller.

As described above, the distance between two points is detected in accordance with the distance between two points by use of the fact that the ratio of the voltage detected by the first voltage detector and the voltage detected by the second voltage detector changes. It is therefore possible to detect the distance between two points appropriately. In addition, the distance between two points can be detected by the measured voltage for use in coordinate detection or two-point touch determination, thereby eliminating the necessity of voltage measurement for newly detecting the distance between two points. Therefore, it is possible to reduce the number of times of the voltage measurement, accordingly.

In addition, according to a fifth aspect of the present invention, when the two-point touch determining unit determines that the two points are touched, the pressing force detector may detect a pressing parameter having a correlation with a pressing force of the touch input and having a same or a substantially same degree of the correlation with the pressing force of each point.

As described above, by use of the pressing parameter having a substantially same degree of influence of the pressing force of each point, it is made possible to calculate the distance between two points even in a case where the pressing force at each point is different.

Furthermore, according to a first aspect of a method for detecting a distance between touch input points of a touch panel of the present invention, there is provided a method for detecting a distance between touch input points of a touch panel, the method comprising: a between-terminal resistance measuring step for measuring a resistance value of a pair of electrode terminals arranged at edge side portions opposing each other in each of two resistance films in the touch panel, the two resistance films closely opposing each other to be capable of being in contact with each other so that the pair of electrode terminals are vertically perpendicular to each other; a two-point touch determining step for determining whether or not two points are touched on the touch panel based upon the resistance value measured by the between-terminal resistance measuring step; a pressing force detecting step for detecting a pressing force of a touch input when the two-point touch determining step determines that the two points are touched; and a two-point distance detecting step for detecting a distance between the two points based upon the resistance value measured by the between-terminal resistance measuring step and the pressing force measured by the pressing force detecting step, when the two-point touch determining step determines that the two points are touched.

Furthermore, according to a second aspect of the method, there is provided a method for detecting a distance between touch input points of a touch panel, the method comprising: a first voltage detecting step for, with a power-supply voltage being applied between a pair of the electrode terminals arranged at edge side portions opposing each other in each of two resistance films in a touch panel, the two resistance films closely opposing each other to be capable of being in contact with each other so that the pair of electrode terminals are vertically perpendicular to each other, and with the pair of the electrode terminals of the other of the resistance films being short-circuited, detecting a voltage of any one of the pair of electrode terminals of the other of the resistance films; a second voltage detecting step for, with a power-supply voltage being applied, through a resistance, between the pair of the electrode terminals of one of the resistance films and with the pair of the electrode terminals of the other of the resistance films being short-circuited, detecting a voltage of any one of the pair of electrode terminals of the other of the resistance films; a two-point touch determining step for determining whether or not two points are touched on the touch panel based upon a ratio of the voltage detected by the first voltage detecting step and the voltage detected by the second voltage detecting step; a pressing force detecting step for detecting a pressing force of a touch input when the two-point touch determining step determines that the two points are touched; and a two-point distance detecting step for detecting a distance between the two points based upon the ratio of the voltage detected by the first voltage detecting step and the voltage detected by the second voltage detecting step, and the pressing force measured by the pressing force detecting step, when the two-point touch determining step determines that the two points are touched.

In this manner, there is provided the method for detecting the distance between two points that have been touched in consideration of the pressing force of the touch input. Therefore, it is possible to calculate the distance between two points with accuracy.

Advantageous Effects of the Invention

According to the present invention, since it is possible to detect the distance between two points with accuracy when the two points are touched on the touch panel, the touch panel apparatus is capable of recognizing the operation that matches the operator's intention.

BRIEF DESCRIPTION OF THE DRAWINGS

FIG. 12 is a view illustrative of effects of a first embodiment of the present invention;
FIGS. 13A-13C are views illustrative of gestures of the two-point touch;
FIG. 23 is a view illustrative of a state of a touch input point when xa<xb and ya<yb are satisfied;
FIG. 25 is a circuit diagram illustrative of a configuration of a touch panel apparatus according to a third embodiment of the present invention;
FIG. 31 is a flowchart illustrative of a two-point touch process procedure according to the third embodiment;
FIG. 32 is a circuit diagram when Yp1 is measured;
FIGS. 33A-33B are circuit diagrams when Z1 and Z2 are measured.

DESCRIPTION OF EMBODIMENTS

Hereinafter, embodiments of the present invention will be described in accordance with the drawings.

Figure 1:
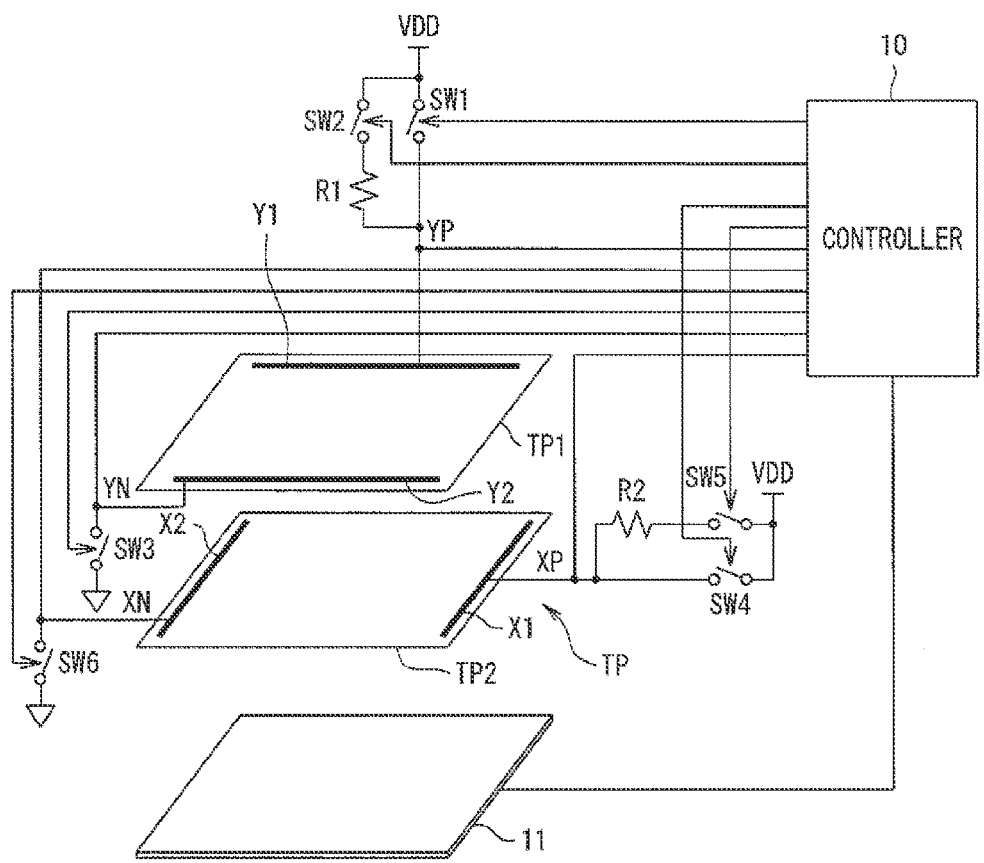
FIG. 1 is a circuit diagram illustrative of a configuration of a touch panel apparatus according to an embodiment of the present invention.

First Embodiment (Configuration)
FIG. 1 is a circuit diagram illustrative of a configuration of a touch panel apparatus according to an embodiment of the present invention.

The touch panel apparatus is provided with: a controller 10 for controlling the overall apparatus; an LCD module 11 for displaying necessary information; and a touch panel TP arranged on the LCD module 11.

The touch panel TP is composed of two touch panels TP1 and TP2. The touch panel TP1 is overlapped on the touch panel TP2 with a minute gap therebetween. The touch panel TP1 has a resistance film provided between terminals Y1 and Y2 composed of a pair of electrodes extending in Y direction. In addition, the touch panel TP2 has a resistance film provided between terminals X1 and X2 composed of a pair of electrodes extending in X direction perpendicular to Y direction.

The touch panels TP1 and TP2 constitute an analog touch panel with the respective resistance films applied thereon, so that even if any point on the touch sensitive surface is touched with a human finger or a pen, the touch can be detected.

This touch panel apparatus is also provided with switches SW1 to SW6.

One end of the switch SW1 is connected to the power supply VDD for applying a predefined direct-current voltage, and the other end thereof is connected to the terminal Y1 of the touch panel TP1. One end of the switch SW2 is connected to the power supply VDD, and the other end thereof is connected through a resistance R1 to the terminal Y1 of the touch panel TP1. One end of the switch SW3 is connected to ground, and the other end thereof is connected to the terminal Y2 of the touch panel TP1.

In addition, one end of the switch SW4 is connected to the power supply VDD, and the other end thereof is connected to the terminal X1 of the touch panel TP2. One end of the switch SW5 is connected to the power supply VDD, and the other end thereof is connected through a resistance R2 to the terminal X1 of the touch panel TP2. One end of the switch SW6 is connected to ground, and the other end thereof is connected to the terminal X2 of the touch panel TP2.

These switches SW1 to SW6 are controlled by the controller 10 to be open or closed.

The controller 10 controls opening and closing of the switches SW1 to SW6, and acquires voltages XP, XN, YP, and YN generated in the respective terminals X1, X2, Y1, and Y2 in a predefined connecting state. Herein, the controller 10 is provided with an AD converter, not illustrated, for converting a measured voltage into digital data.

Then, the controller 10 determines whether or not two points on the touch panel TP are touched based upon the acquired voltage values. In addition, when one point is touched, the controller 10 detects and outputs the touched position (X coordinate, Y coordinate), and when two points are touched, the controller 10 detects and outputs the central coordinates between the two points and the distance thereof (X direction distance, Y direction distance).

Figure 2:
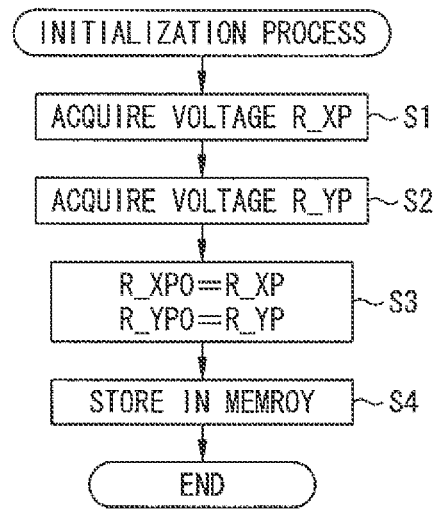
FIG. 2 is a flowchart illustrative of an initialization process procedure executed by a controller 10.

FIG. 2 is a flowchart illustrative of an initialization process procedure performed by the controller 10.

This initialization process is performed while the touch panel TP is not being touched.

Figure 3:
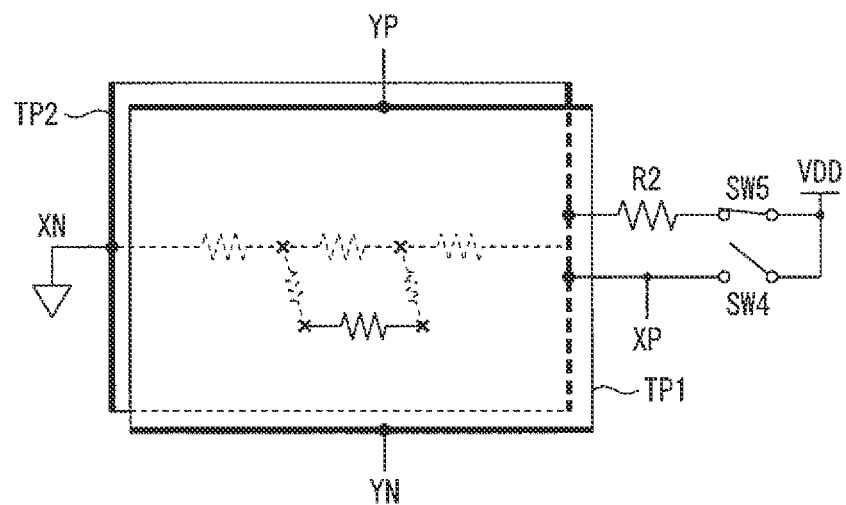
FIG. 3 is a circuit diagram at the time of measuring R_XP.

Firstly, at step S1, a voltage XP (voltage R_XP) of the terminal X1 in a state illustrated in FIG. 3 is acquired. That is, the switches SW5 and SW6 are controlled to be in a closed state and the other switches are controlled to be in an open state, so that the voltage of the power supply VDD is supplied through the resistance R2 to the terminal X1, and the terminal X2 is connected to ground. In this manner, the voltage of the power supply VDD is applied through the resistance R2 between the terminals X1 and X2.

Then, in this state, the voltage level of the terminal X1 is measured. The voltage level measured at this time has a voltage value divided by the resistance value between the terminals X1 and X2 and the known value of the resistance R2. In this manner, the voltage level corresponding to the resistance value between the terminals X1 and X2 is acquirable. Specifically, FIG. 3 illustrates a circuit configuration between the terminals X1 and X2 when two points are touched.

Figure 4:
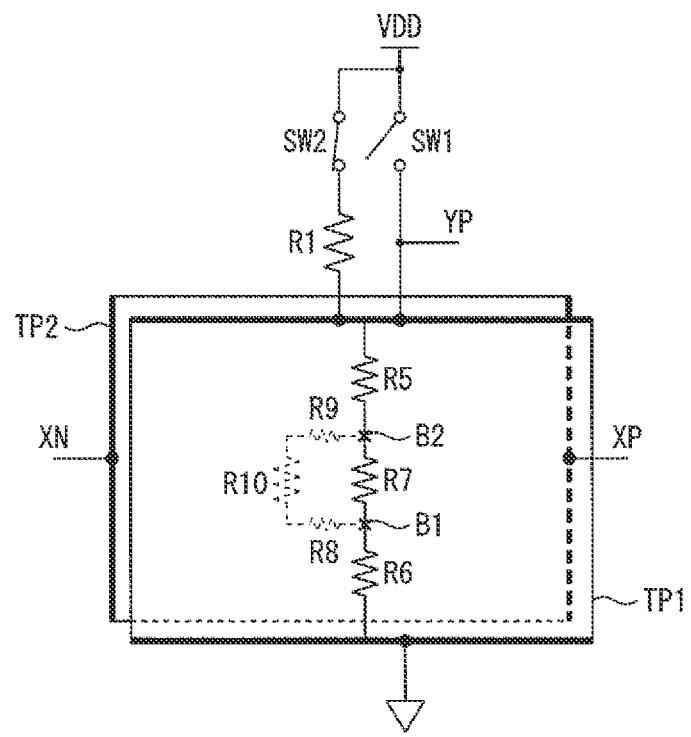
FIG. 4 is a circuit diagram at the time of measuring R_YP.

Next, at step S2, a voltage YP (voltage R_YP) of the terminal Y1 in a state illustrated in FIG. 4 is acquired. That is, the switches SW2 and SW3 are controlled to be in the closed state and the other switches are controlled to be in the open state, so that the voltage of the power supply VDD is supplied through the resistance R1 to the terminal Y1, and the terminal Y2 is connected to ground. In this manner, the voltage of the power supply VDD is applied through the resistance R1 between the terminals Y1 and Y2. Then, in this state, the voltage level of the terminal Y1 is measured.

The voltage level measured at this time has a voltage value divided by the resistance value between the terminals Y1 and Y2 and the known value of the resistance R1. In this manner, the voltage level corresponding to the resistance value between the terminals Y1 and Y2 is acquirable. Specifically, FIG. 4 illustrates a circuit configuration between the terminals Y1 and Y2 when two points are touched.

Next, at step S3, the voltage R_XP acquired at step S1 is set to the reference voltage R_XP0, and in addition, the voltage R_YP acquired at step S2 is set to the reference voltage R_YP0.

Then, at step S4, the reference voltages R_XP0 and R_YP0 set at step S3 are stored in a memory (not illustrated), and the initialization process ends.

Figure 5:
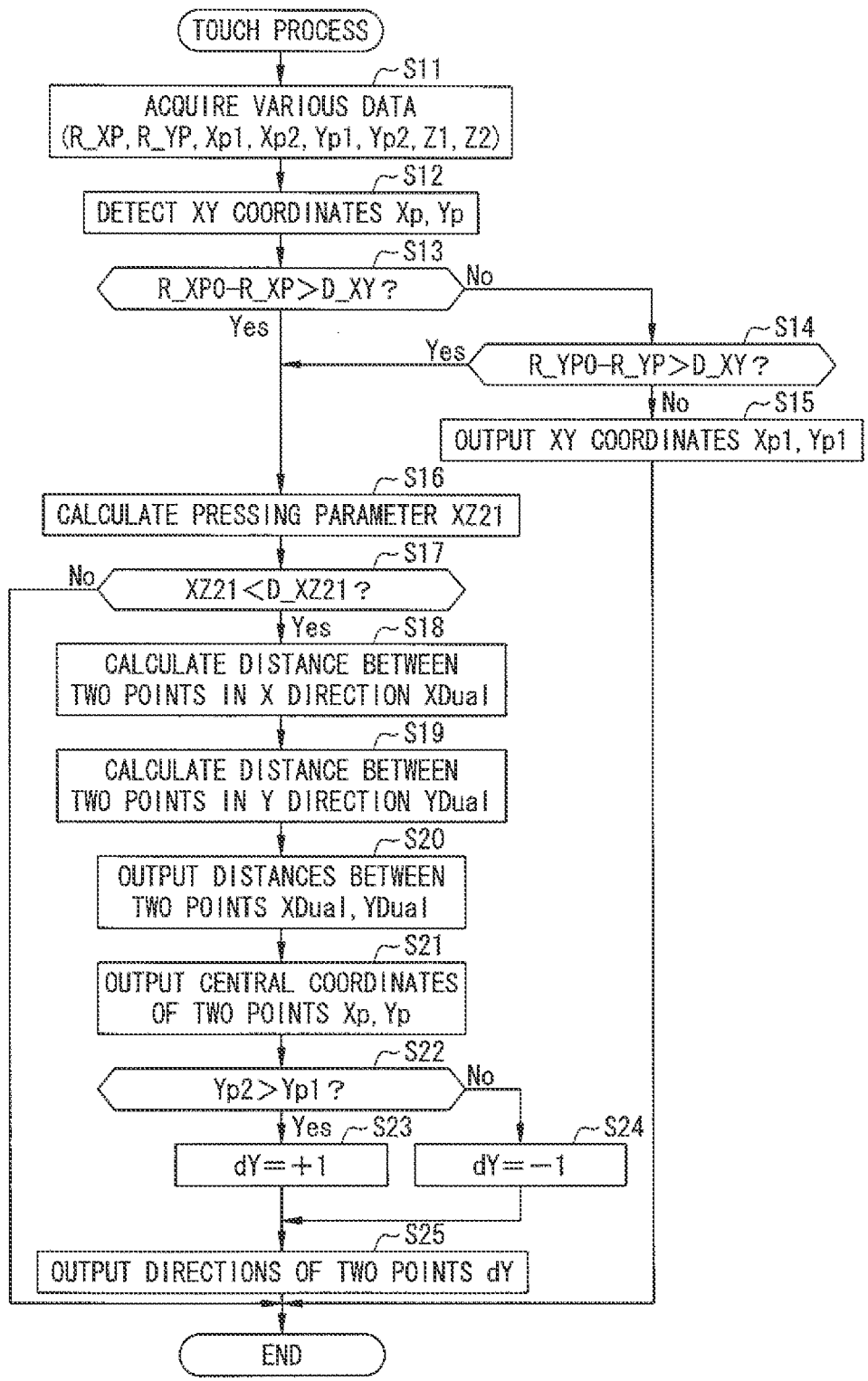
FIG. 5 is a flowchart illustrative of a two-point touch process procedure executed by the controller 10.

FIG. 5 is a flowchart illustrative of a touch process procedure performed by the controller 10.

This touch process is performed every predefined time (every 2 msec to 10 msec) while the touch panel TP is being touched, and firstly, various types of data are acquired at step S11. In detail, the voltages R_XP, R_YP, Xp1, Xp2, Yp1, Yp2, Z1, and Z2 are acquired.

The voltage R_XP is the voltage XP measured in the state illustrated in FIG. 3, and the voltage R_YP is the voltage YP measured in the state illustrated in FIG. 4.

Figure 6:
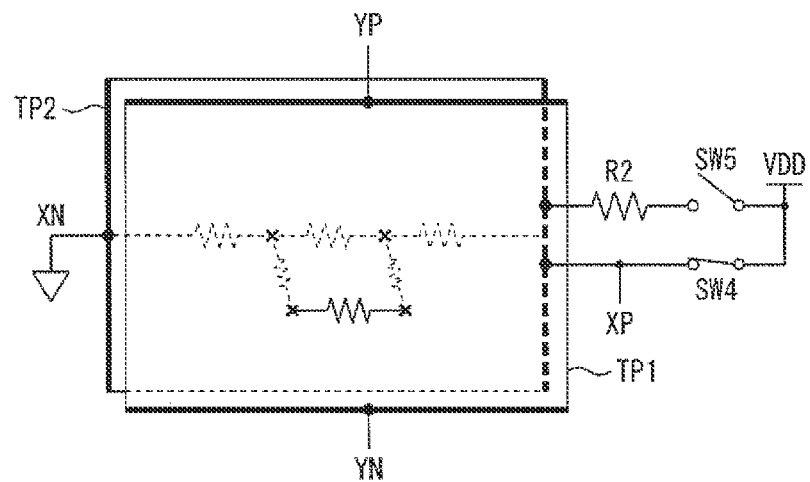
FIG. 6 is a circuit diagram when Xp1 and Xp2 are measured.

Additionally, the voltages Xp1 and Xp2 are the voltages YP and YN measured in the state illustrated in FIG. 6. That is, in contrast to the state of FIG. 3, the voltage levels of the terminals Y1 and Y2 of the other panel are respectively measured with the switch SW5 in the open state, the switch SW4 in the closed state, and the voltage of the power supply VDD applied between the terminals X1 and X2.

Figure 7:
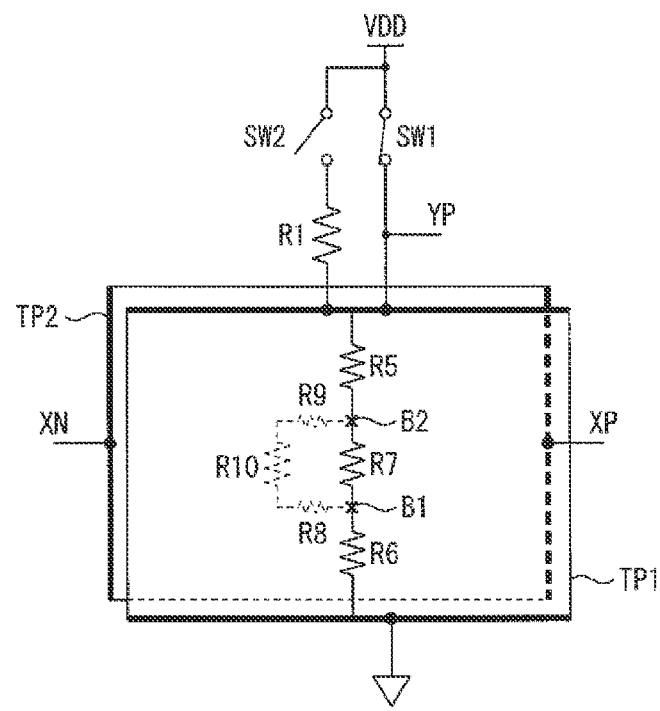
FIG. 7 is a circuit diagram when Yp1 and Yp2 are measured.

The voltages Yp1 and Yp2 are the voltages XP and XN measured in the state of FIG. 7. That is, in contrast to the state of FIG. 4, the voltage levels of the terminals X1 and X2 of the other panel are respectively measured with the switch SW2 in the open state, the switch SW1 in the closed state, and the voltage of the power supply VDD applied between the terminals Y1 and Y2.

Figure 8:
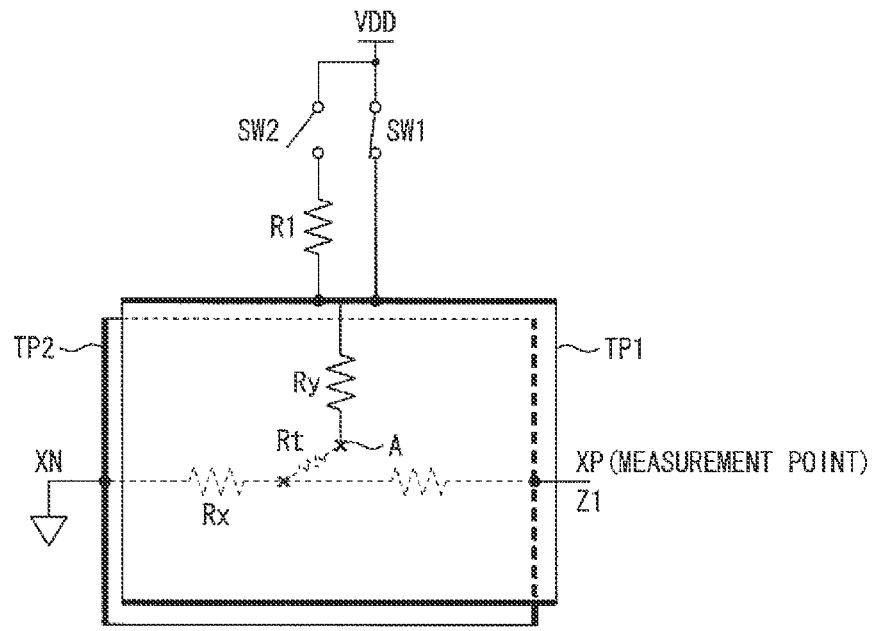
FIG. 8 is a circuit diagram when Z1 is measured.

Furthermore, the voltage Z1 is the voltage XP measured in the state of FIG. 8. That is, the switches SW1 and SW6 are controlled to be in the closed state and the other switches are controlled to be in the open state at the time of measuring the voltage Z1, so that the voltage of the power supply VDD is supplied to the terminal Y1, and the terminal X2 is connected to ground. Then, in this state, the voltage level of the terminal Y1 is measured. Herein, FIG. 8 illustrates a circuit configuration between the terminals when one point is touched.

Figure 9:
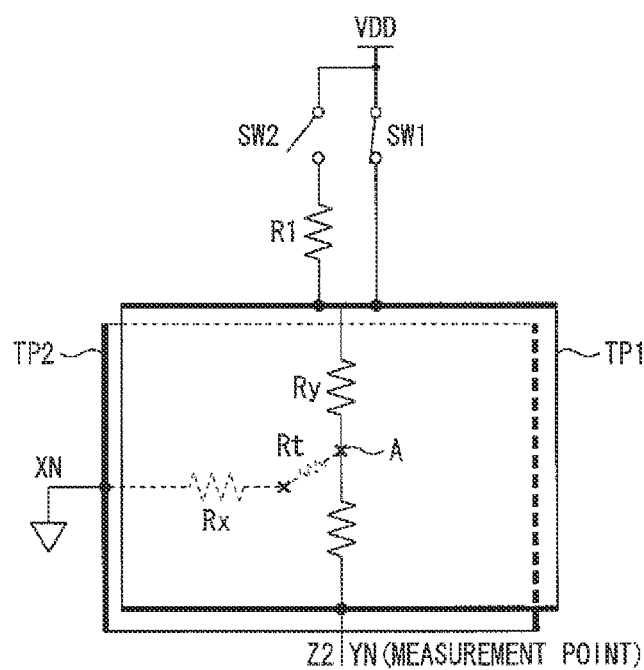
FIG. 9 is a circuit diagram when Z2 is measured.

In addition, the voltage Z2 is the voltage YN measured in the state illustrated in FIG. 9. That is, the switches SW1 and SW6 are controlled to be in the closed state and the other switches are controlled to be in the open state at the time of measuring the voltage Z2 in the same manner with FIG. 8, so that the voltage of the power supply VDD is supplied to the terminal Y1 and the terminal X2 is connected to ground. Then, in this state, the voltage level of the terminal Y2 is measured. Herein, FIG. 9 illustrates a circuit configuration between the terminals when one point is touched.

Specifically, an averaging process may be performed for acquiring the various types of data. As the averaging process, for example, after six data are acquired and the maximum value and the minimum value are deleted from the six data, a process for calculating the average of the remaining four data is performed. This improves the reliability of the measured data.

Next, at step S12, X coordinate Xp is calculated by the following expression (1) based upon the voltages Xp1 and Xp2 acquired at the step S11, and Y coordinate Yp is calculated by the following expression (2) based upon the voltages Yp1 and Yp2 acquired at the step S11.

$$Xp=(Xp1+Xp2)/2 \quad (1)$$

$$Yp=(Yp1+Yp2)/2 \quad (2)$$

The coordinates (Xp, Yp) calculated here are central coordinates of two points when the two points are touched.

Next, at step S13, it is determined whether or not the difference between the voltage R_XP acquired at the step S11 and the reference voltage R_XP0 stored in the memory (R_XP0−R_XP) is greater than a predefined determination threshold D_XY. Then, when R_XP0−R_XP>D_XY is satisfied, the two-point touch is determined and processing goes to step S15 to be described later.

In contrast, when $R_{13}$ XP0−R_XP<=D_XY is satisfied, processing goes to step S14, and it is determined whether or not the difference between the voltage R_YP acquired at the step S11 and the reference voltage R_YP0 stored in the memory (R_YP0−R_YP) is greater than a predefined determination threshold D_XY. Then, when R_YP0−R_YP<=D_XY is satisfied, the one-point touch is determined and processing goes to step S15.

At step S15, the voltages Xp1 and Yp1 acquired at step S11 are output as XY coordinates of the touched position, and the touch process ends.

On the other hand, when it is determined at step S14 that R_YP0−R_YP>D_XY is satisfied, the two-point touch is determined and processing goes to step S16 to calculate a pressing force parameter XZ21. This pressing force parameter XZ21 is a parameter having a correlation with the pressing force of the touch input point, and has a smaller value as the pressing force becomes greater. Herein, the pressing force parameter XZ21 is calculated by the following expression.

$$XZ21=Xp/4096(Z2/Z1-1) \quad (3)$$

Specifically, the above expression (3) is a calculation expression in a case of 12 bits ($2^{12}=4096$).

Subsequently, at step S17, it is determined whether or not the pressing force parameter XZ21 calculated at step S16 is smaller than a predefined determination threshold D_XZ21. Then, when XZ21>=D_XZ21 is satisfied, it is determined that a certain pressure is not applied onto the touch input point, and the touch process ends without change. In contrast, when XZ21<D_XZ21 is satisfied, it is determined that a certain pressure is applied onto the touch input point, and the touch process goes to step S18.

At step S18, a distance between two points in X direction XDual is calculated by the following expression.

$$XDual=A \cdot (R\_XP0-R\_XP-B) \cdot (XZ21+C)+D \quad (4)$$

where A, B, C, and D are respectively predefined constant numbers.

In this manner, a two-point distance reference value $A \cdot (R\_XP0-R\_XP-B)$ calculated based upon a difference between the reference voltage R_XP0 and the voltage R_XP is corrected by a correction coefficient (XZ21+C) set together with the pressing force parameter XZ21 to calculate the distance between two points in X direction XDual.

Next, at step S19, a distance between two points in Y direction YDual is calculated by the following expression.

$$YDual=A \cdot (R\_YP0-R\_YP-B) \cdot (XZ21+C)+D \quad (5)$$

In this manner, a two-point distance reference value $A \cdot (R\_YP0-R\_YP-B)$ calculated based upon a difference between the reference voltage R_YP0 and the voltage R_YP is corrected by a correction coefficient (XZ21+C) set together with the pressing force parameter XZ21 to calculate the distance between two points in Y direction YDual.

Then, at step S20, the distances between two points Xdual and YDual calculated at steps S18 and S19 are output and processing goes to step S21.

At step S21, the central coordinate (Xp, Yp) between the two points detected at step S12 is output and processing goes to step S22.

At step S22, it is determined that whether or not the voltage Yp2 acquired at step S11 is greater than the voltage Yp1. Then, when Yp2>Yp1 is satisfied, processing goes to step S23, "+1" is set to information dY indicating the directions of two points, and processing goes to step S25. On the other hand, when Yp2<=Yp1 is satisfied, processing goes to step S24, "−1" is set to the information dY, and processing goes to step S25.

If the coordinates of the two points are set at (xa, ya), (xb, yb) (where xa<xb), (xa, yb), (xb, ya) where the Y coordinates are exchanged cannot be distinguished from the central coordinate between the two points and the information on the distance between two points. In the circuit of FIG. 7, the voltage of XN is susceptible to the influence of ya and the voltage XP is susceptible to the influence of yb. Therefore, when Yp2>Yp1 is satisfied, ya>yb is determined, and when Yp2<Yp1 is satisfied, ya<yb is determined.

That is, when xa<xb and ya>yb are satisfied, dY=+1 is determined, and xa<xb and ya<yb are satisfied, dY=−1 is determined.

Subsequently, the information dY indicating the directions of the two points at step S25 is output and the touch process ends.

Specifically, step S11 of FIG. 5 corresponds to a between-terminal resistance measuring unit, steps S13 and S14 correspond to a two-point touch determining unit, step S16 corresponds to a pressing force detector, and steps S18 and S19 correspond to a two-point distance detector.

(Operations)

Next, operations of the present embodiment will be described.

Now, assuming that the operator does not touch the touch panel TP, the controller 10 starts the initialization process of FIG. 2, controls the switches SW1 to SW6 to be in the connecting state illustrated in FIG. 3, and measures the voltage R_XP (step S1). Next, the controller 10 controls the switches SW1 to SW6 to be in the connecting state illustrated in FIG. 4, and measures the voltage R_YP (step S2). Then, the controller 10 sets the measured voltages to the voltage R_XP0 and the voltage R_YP0, respectively (step S3), and stores the voltages in a memory (step S4).

Subsequently, when the touch panel TP is touched, the controller 10 performs the touch process of FIG. 5. Then, the controller 10 acquires the various types of data (voltages R_XP, R_YP, Xp1, Xp2, Yp1, Yp2, Z1, Z2) to be used for detecting coordinates of the touched position, determining the two-point touch, and detecting the distance between two points (step S11).

Figure 10:
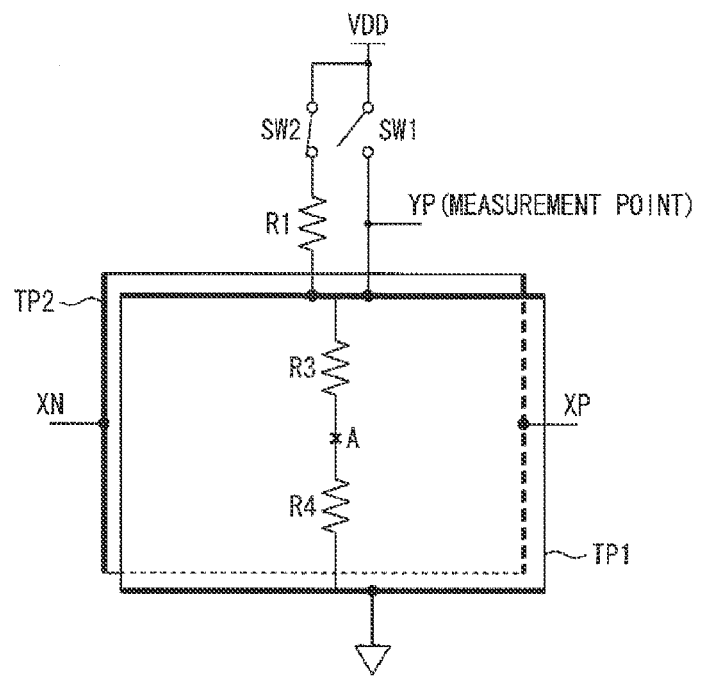
FIG. 10 is a view illustrative of a resistance between terminals when one point is touched.

FIG. 10 is a view illustrative of a resistance between the terminals when one point is touched. Herein, FIG. 10 illustrates a case where a point A is touched.

In this manner, when one point is touched, the resistance value between the terminals Y1 and Y2 satisfies R3+R4=R0 (constant) regardless of the position of the point A. Therefore, the voltage R_YP has a constant value regardless of the position A. In addition, the resistance value between the terminals when one point is touched is equal to that when no point is touched, and the voltage R_YP when one point is touched is equal to the voltage R_YP0 when no point is touched. Likewise, the voltage R_XP when one point is touched has the same value with the voltage R_XP0 when no point is touched.

Accordingly, in this case, since R_XP0−R_XP<D_XY is satisfied (step S13: No) and R_YP0−R_YP<D_XY is satisfied (step S14: No), the controller 10 determines the one-point touch is performed, outputs the coordinates Xp1, Yp1 of the touched position (step S15), and the touch process ends.

Next, the case where two points are touched will be described.

As illustrated in FIG. 4, when the points B1 and B2 on the touch panel TP are touched, the upper panel (the touch panel TP1) comes into touch with the lower panel (the touch panel TP2) at the points B1 and B2 and resistances R8 to R10 are generated between the terminals Y1 and Y2. In this situation, the resistance R8 is the resistance value between the upper and lower panels at the point B1, the resistance R9 is the resistance value between the upper and lower panels at the point B2, and the resistance R10 is the resistance value on the touch panel TP2 between the points B1 and B2.

That is, when two points are touched, the resistance value between the terminals Y1 and Y2 satisfies R5+(R7//(R8+R9+R10))+R6. In the above expression, "//" is a mark indicating a combined resistance value in parallel connection.

In this manner, the resistance between B1 and B2 (R7//(R8+R9+R10)) is smaller than the resistance R7 between the points B1 and B2 on the upper panel (touch panel TP1). Thus, the voltage R_YP when two points are touched is smaller than the voltage R_YP0 when no point is touched.

Accordingly, in this case, R_YP0−R_YP>D_XY (step S14: Yes) is satisfied, the controller 10 determines the two-point touch.

In this manner, whether or not two points are touched is determined by use of the fact that the resistance value between the terminals on the respective panels when two points are touched is smaller than that when one point is touched. Then, when the two-point touch is determined, a process of calculating the distance between the two points starts.

Meanwhile, (R_XP0−R_XP) or (R_YP0−R_YP) is a value correlated only with the distance between two points, when a contact resistance value (pressing force of the touch input point) at the contact point of the upper and lower panels is constant. However, even if the distance between two points is constant, as the contact resistance value changes, (R_XP0−R_XP) or (R_YP0−R_YP) also changes.

Figure 11:
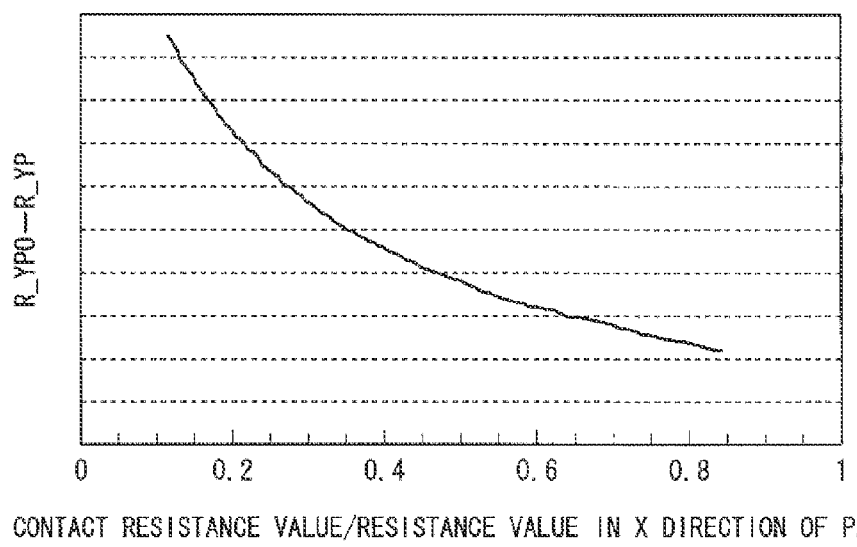
FIG. 11 is a view illustrative of a relationship between a pressing force and (R_YP0−R_YP), when a distance between two points is constant.

FIG. 11 is a view illustrative of a relationship between a contact resistance value and (R_YP0−R_YP), when the distance between two points is constant, where the horizontal axis represents the contact resistance value normalized by the resistance value in X direction and the vertical axis represents (R_YP0−R_YP). As illustrated in FIG. 11, as the pressing force is greater, that is, as the contact resistance value is smaller, (R_YP0−R_YP) becomes greater. Accordingly, in order to calculate the distance between two points accurately, the contact resistance value (pressing force) needs to be considered.

Hence, in the present embodiment, the distances between two points XDual and YDual are corrected by use of the pressing parameter XZ21 having a correlation with the contact resistance value (pressing force).

The contact resistance value Rt when one point is touched is acquired by the following expression, when a sheet resistance Rxplate of the touch panel TP2 in X direction is known.

$$Rt = Rxplate \cdot Xp/4096(Z2/Z1-1) \quad (6)$$

Therefore, the parameters in the expression (3) are set in the above expression (6) to calculate as the pressing parameter XZ21 (step S16).

In the case of the two-point touch, the contact resistance value Rt calculated by the above expression (6) is easily susceptible to the influence of the contact resistance value at the touch input point located closer to the measurement points of the voltages Z1 and Z2. However, when the contact resistance values of the two points are almost the same, the contact resistance value Rt may have a value in almost proportion to the contact resistance from the above expression (3). For this reason, in the present embodiment, even in the case of two-point touch, the calculation expression for the pressing parameter XZ21 is set based upon the calculation expression of the contact resistance in the case of one-point touch. In this manner, it is possible to simplify the calculation process of the pressing parameter XZ21 by substituting with the calculation expression for one-point touch.

Next, the distances between two points XDual and YDual are calculated by the above expressions (4) and (5) by use of the calculated pressing parameter XZ21 (steps S18 and S19).

In this situation, as the pressing force at the touch input point is greater, the contact resistance value becomes smaller. Thus, the voltage Z1 and the voltage Z2 have close values in the above expression (3), and Z2/Z1 comes closer to "1". That is to say, the pressing parameter XZ21 comes closer to "0".

Accordingly, as the pressing force at the touch input point is greater, the correction amount of a two-point distance reference value A (R_YP0−R_YP−B) becomes smaller. In other words, as the pressing force at the touch input point is smaller, the pressing parameter XZ21 is set to a greater value to correct for increasing the two-point distance reference value A (R_YP0−R_YP−B).

In this manner, a correction coefficient (XZ21+c) is determined in accordance with the pressing force to correct the two-point distance reference value A (R_YP0−R_YP−B). It is therefore possible to determine the distance between two points correctly in accordance with the pressing force.

FIG. 12 is a view illustrative of effects of the first embodiment of the present invention, and illustrates YDual when the distance between two points is corrected in accordance with the pressing force.

As illustrated in FIG. 12, YDual is calculated when the distance between two points is set constant and the pressing force is changed, YDual with the influence of the pressing force (contact resistance value) suppressed can be calculated. This applies to the distance between two points in X direction XDual.

(Effects)

In this manner, in the above embodiment, when two points on the touch panel are touched, the distance between the two points is calculated in consideration of the pressing forces of the touch input points. For this reason, even if the operator performs an operation of changing the pressing force with the distance between two points being constant, it is possible to calculate the constant distance between two points correctly. Additionally, when the operator performs an operation of changing the distance between two points while changing the pressing forces, it is possible to prevent false determination that the distance between two points is constant. In this manner, it is possible to calculate the distance between two points with accuracy.

In addition, in order to calculate the distance between two points, the reference value of the distance between two points is calculated based upon a difference between the resistance value between the terminals when the touch panel is not touched and the resistance value between the terminals when the touch panel is touched, and the reference values are corrected in accordance with the pressing force. Thus, since the change amount in the resistance value between the terminals in accordance with a change in the pressing force (contact resistance value) can be corrected, it is possible to calculate the distance between two points correctly.

Furthermore, the voltages Z1 and Z2 are measured and the pressing parameter having a correlation with the pressing force is calculated. This eliminates the necessity of the provision of a sensor or the like for detecting the pressing force of the touch input point, thereby achieving the downsizing of the touch panel apparatus and the reduction of costs thereof.

(Applications)

Figure 14:
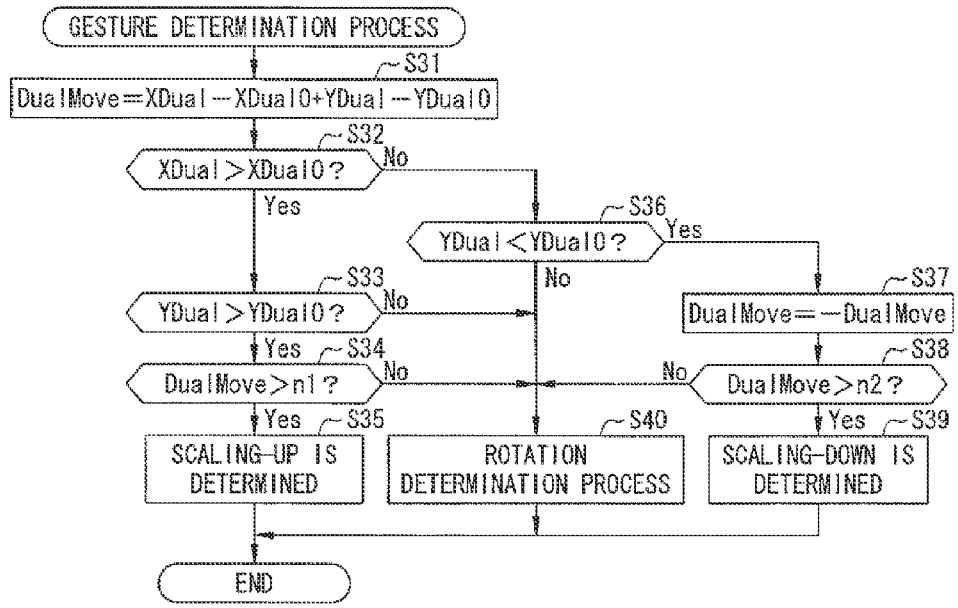
FIG. 14 is a flowchart illustrative of a gesture determination process procedure.

Specifically, in the above-described first embodiment, after the distances between two points XDual and YDual are calculated, a gesture of the two-point touch illustrated in FIG. 13A as scaling up, which is the operation of opening the distance between two fingers; FIG. 13B as scaling down, which is the operation of closing two fingers; and FIG. 13C as rotation, which is the operation of moving the finger, may be determined by use of the distances between two points XDual and YDual. In this case, after the touch process illustrated in FIG. 5 as described above is performed, a gesture determination process illustrated in FIG. 14 is performed.

Firstly, at step S31, the change amount DualMove of the distance between two points is calculated by the following expression.

$$\text{DualMove}=X\text{Dual}-X\text{Dual0}+Y\text{Dual}-Y\text{Dual0} \quad (7)$$

where XDual0 and YDual0 are respectively XDual and YDual, which are the distances between two points calculated at the previous sampling.

Next, at step S32, it is determined whether or not the distance between two points in X direction XDual is greater than XDual0 that is a previous value. When XDual>XDual0 is satisfied, an increase in the distance between two points in X direction is determined and processing goes to step S33. When XDual<=XDual0 is satisfied, processing goes to step S36 to be described later.

At step S33, it is determined whether or not the distance between two points in Y direction YDual is greater than YDual0 that is a previous value. When YDual>YDual0 is satisfied, an increase in the distance between two points in Y direction is determined and processing goes to step S34. When XDual<=XDual0 is satisfied, processing goes to step S40 to be described later.

At step S34, it is determined whether or not a change amount of the distance between two points DualMove calculated at step S31 is greater than a preset determination threshold n1. Then, when DualMove<=n1 is satisfied, processing goes to step S40 to be described later. When DualMove>n1 is satisfied, processing goes to step S35 and determines that the gesture of the two-point touch is a scaling up operation and the gesture determination process ends.

At step S36, it is determined whether or not the distance between two points in Y direction YDual is smaller than YDual0 that is a previous value. When YDual<YDual0 is satisfied, a decrease in the distance between two points in Y direction is determined and processing goes to step S37. When YDual>=YDual0 is satisfied, processing goes to step S40 to be described later.

At step S37, the sign of the change amount of the distance between two points DualMove calculated at step S31 is reversed, and processing goes to step S38. Then, at step S38, it is determined whether or not a change amount of the distance between two points DualMove calculated at step S37 is greater than a preset determination threshold n2. When DualMove<=n2 is satisfied, processing goes to step S40 to be described later. When DualMove>n2 is satisfied, processing goes to step S39 to determine that the gesture of the two-point touch is a scaling down operation and the gesture determination process ends.

Additionally, at step S40, it is determined that the two-point touch gesture is a rotation operation. A rotation determination process illustrated in FIG. 15 is performed and the gesture determination process ends.

Figure 15:
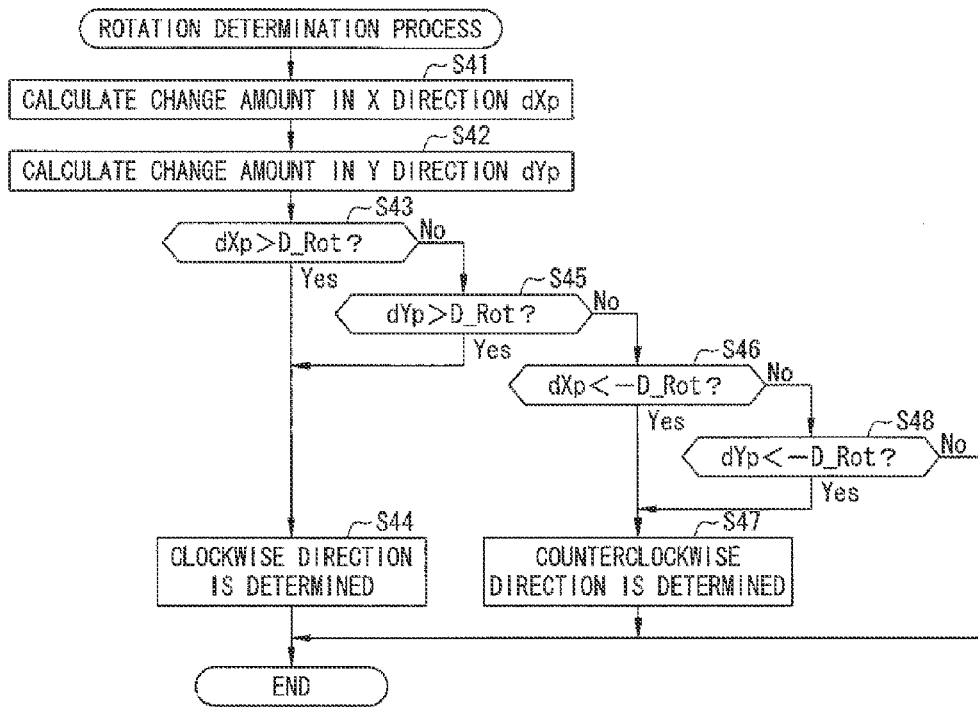
FIG. 15 is a flowchart illustrative of a rotation determination process procedure.

As illustrated in FIG. 15, in the rotation determination process, firstly, a change amount in X direction dXp=Xp−Xp0 is calculated at step S41. Herein, Xp0 denotes an X coordinate Xp calculated in the previous sampling.

Next, at step S42, a change amount in Y direction dYp=Yp−Yp0 is calculated. Herein, Yp0 denotes a Y coordinate Yp calculated in the previous sampling.

Next, at step S43, it is determined whether or not the change amount in X direction dXp calculated at step S41 is greater than a preset rotation determination threshold D_Rot (>0). Then, when dXp>D_Rot is satisfied, processing goes to step S44 to determine that the two-point touch gesture is a clockwise rotation operation, and the rotation determination process ends. On the other hand, when dXp<=D_Rot is satisfied, processing goes to step S45 to determine whether or not the change amount in Y direction dYp calculated at step S42 is greater than the rotation determination threshold D_Rot. Then, when dYp>D_Rot is satisfied, processing goes to step S44, and when dYp<=D_Rot is satisfied, processing goes to step S46.

At step S46, whether or not the change amount in X direction dXp calculated at step S41 is smaller than a rotation determination threshold−D_Rot. Then, when dXp<−D_Rot is satisfied, processing goes to step S47 to determine that the two-point touch gesture is a counterclockwise rotation operation, and the rotation determination process ends. On the other hand, when dXp>=−D_Rot is satisfied, processing goes to step S48 to determine whether or not the change amount in Y direction dYp calculated at step S42 is smaller than the rotation determination value−D_Rot. Then, when dYp<−D_Rot is satisfied, processing goes to step S47. When dYp>=−D_Rot is satisfied, the rotation determination process ends without change.

As described above, in order to calculate the distances between two points XDual and YDual, the correction is made in accordance with the pressing force and the influence of the contact resistance value is suppressed. It is thus possible to perform a gesture determination with accuracy, by use of the distances between two points XDual and YDual that have been calculated as described above.

Figure 16:
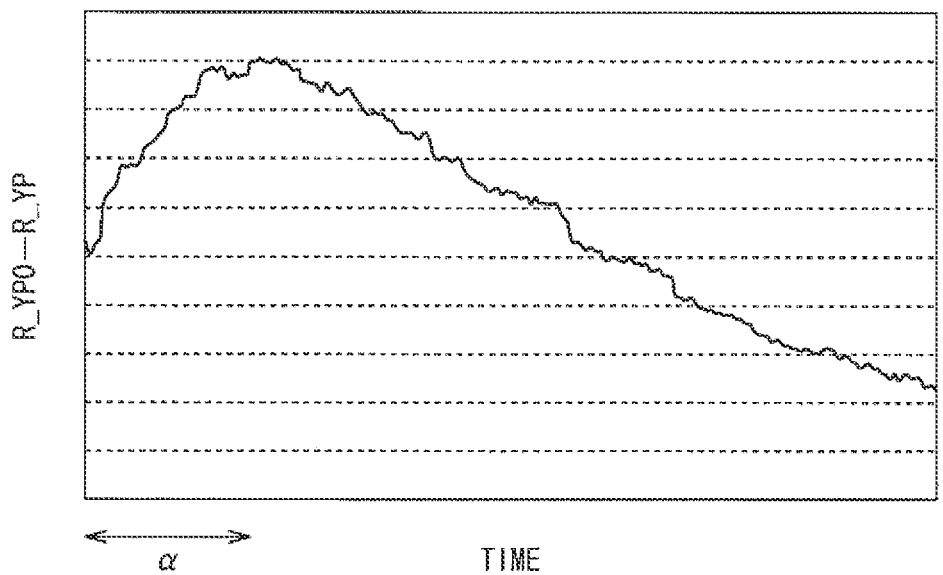
FIG. 16 is a view illustrative of (R_YP0−R_YP) before correction at the time of scaling-down operation.

For example, in the scaling down operation, in some cases, after two points start to be pressed, the pressing forces are gradually becoming greater as two fingers are closing to each other. In such cases, unless the correction is made in consideration of the pressing forces, (R_YP0−R_YP) changes with time as illustrated in FIG. 16. In this manner, although the actual distance between two points gradually becomes smaller, (R_YP0−R_YP) tends to increase in the period indicating by α in the drawing. Therefore, this will lead to false determination that the distance between two points is increasing (performing the scaling up operation).

Figure 17:
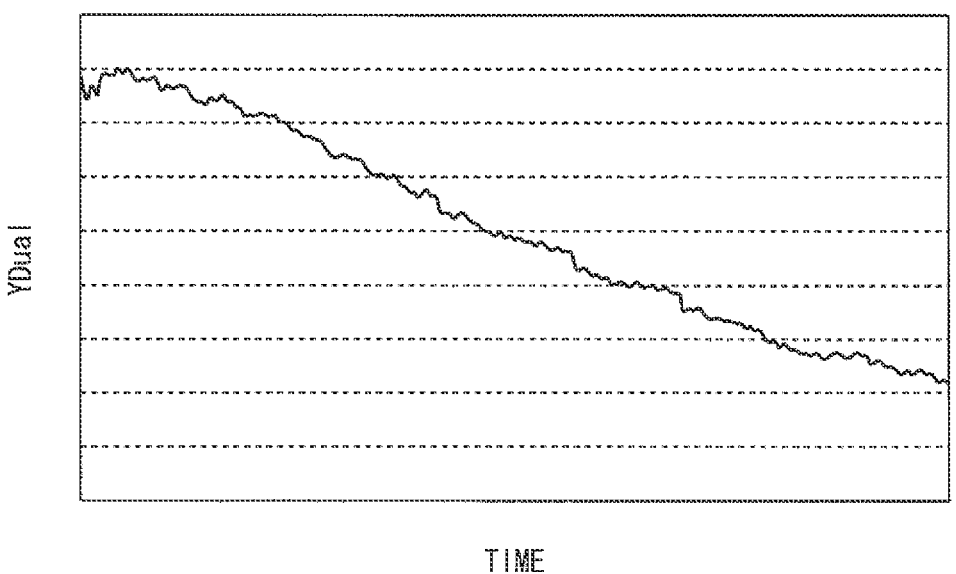
FIG. 17 is a view illustrative of the distance between two points YDual after correction at the time of scaling-down operation.

In contrast thereto, when the correction is made in consideration of the pressing forces according to the present embodiment, it is possible to recognize with certainty that the distance between two points (indicating YDual here) is gradually decreasing as illustrated in FIG. 17, even if the pressing force is gradually increasing at the time of scaling down operation. Accordingly, in this case, the scaling down operation can be determined appropriately within a short period of time after the two points are pressed.

In this manner, it is possible to improve the accuracy of gesture determination by making the correction in consideration of the pressing force. It is possible to provide a touch panel apparatus that can recognize the operation that matches the operator's intention.

Specifically, when the touch panel apparatus is provided only for the gesture determination, A=1 and D=0 can be set in the above expressions (4) and (5). This can simplify the calculation process of the distance between two points.

Second Embodiment

Next, a second embodiment of the present invention will be described.

In the second embodiment, a pressing parameter XZ21 is used in consideration of the influence the contact resistances of the respective points when two points are touched, whereas in the above-described first embodiment, the pressing parameter XZ21 calculated by the above expression (3) is used for calculating the distance between two points.

(Configuration)

Figure 18:
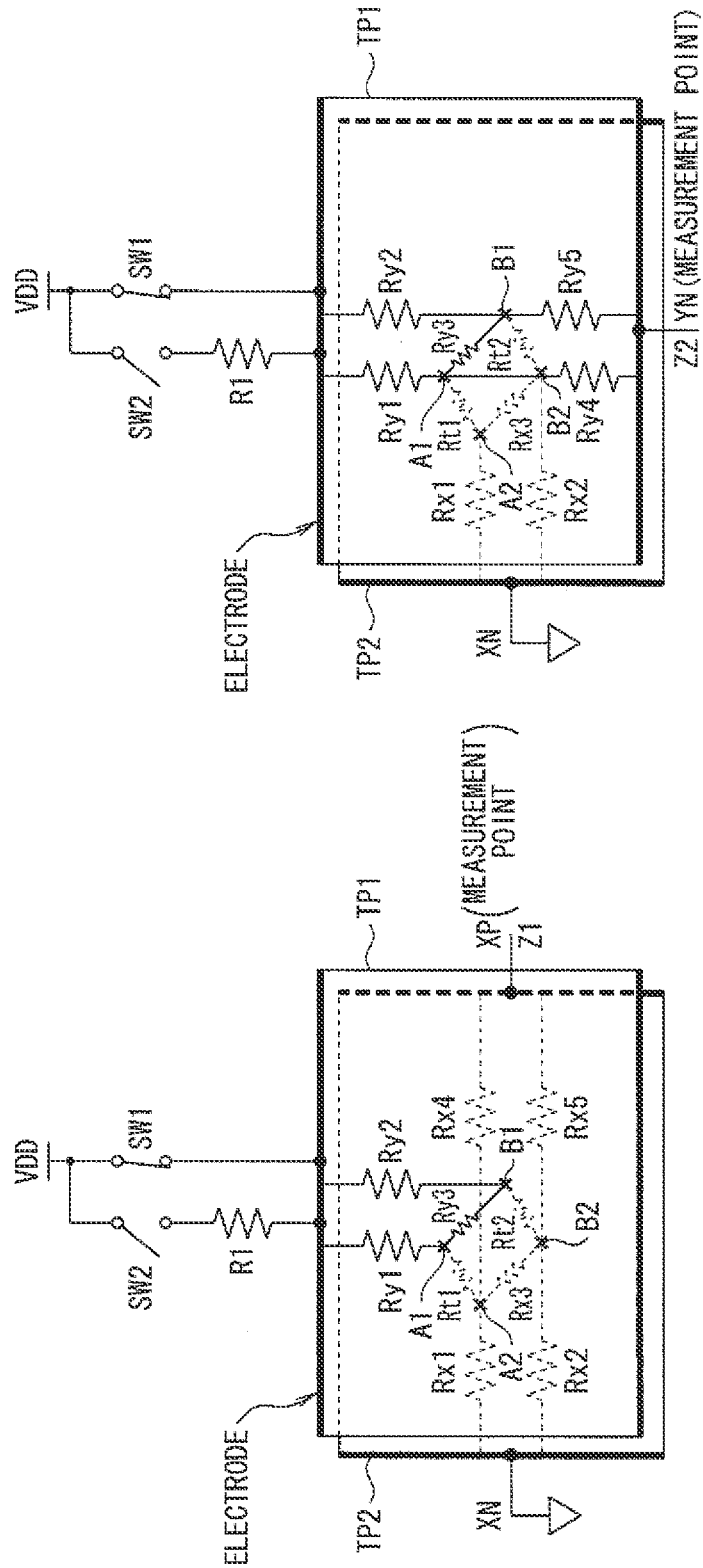
FIGS. 18A-18B are circuit diagrams for measuring Z1 and Z2, when the two points are touched.
Figure 19:
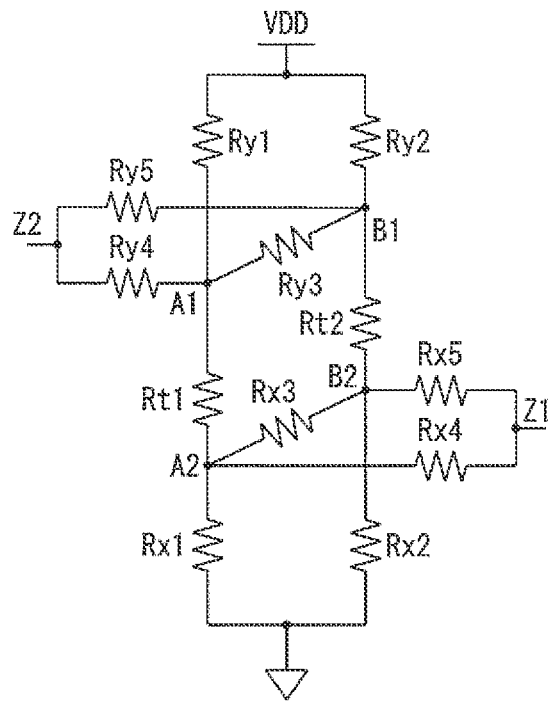
FIG. 19 is a view illustrative of a resistance model for measuring Z1 and Z2, when the two points are touched.

In the case of two-point touch, FIG. 18 illustrates a circuit configuration when the voltages Z1 and Z2 are measured. That is, the resistance model at this time is illustrated in FIG. 19.

Specifically, herein, when A and B are the two points that are being touched, A1 and B1 are the touch input points on the touch panel TP1 and A2 and B2 are the touch input points on the touch panel TP2. (xa, xy) are coordinates of the touch input point A and (xb, yb) are coordinates of the touch input point B, where xa<xb.

In the second embodiment, when the touch panel TP is touched, the controller 10 performs the touch process illustrated in FIG. 5, same as the first embodiment as described above. However, the process at step S16 in FIG. 5 is different.

Figure 20:
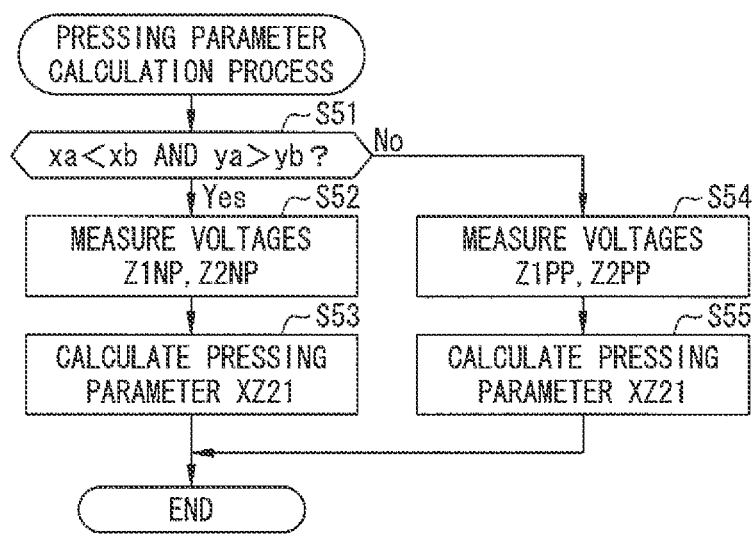
FIG. 20 is a flowchart illustrative of a pressing force parameter calculation process procedure.

In the present embodiment, a pressing parameter calculation process illustrated in FIG. 20 is performed at step S16.

Firstly, at step S51, the positional relationship between the touched two points is determined. In this step, whether or not xa<xb and ya>yb are satisfied is determined. When xa<xb and ya>yb are satisfied, it is determined that the points A and B have the positional relationship illustrated in FIG. 21, processing goes to step S52. Specifically, based upon Yp1 and Yp2 measured at step S11, when Yp1<Yp2 is satisfied, xa<xb and ya>yb are determined.

Figure 22A:
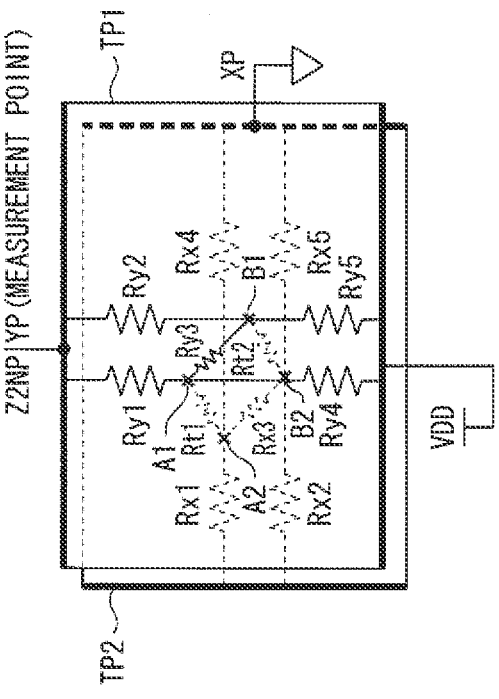
FIGS. 22A-22B are circuit diagrams when Z1NP and Z2NP are measured.
Figure 22B:
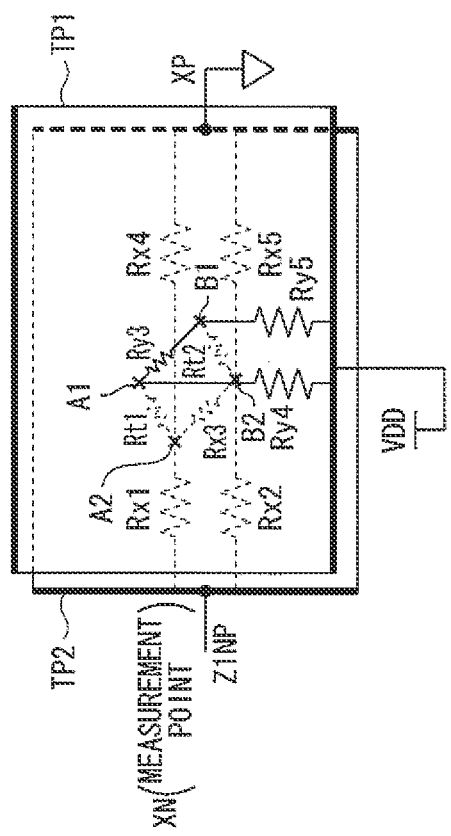

At step S52, a voltage XN (voltage Z1NP) in the state illustrated in FIG. 22A and a voltage YP (voltage Z2NP) in the state illustrated in FIG. 22B are acquired. That is, the voltage of the power supply VDD is directly applied to the terminal Y2, and the terminal X1 is connected to ground. Then, in this state, the voltage levels of the terminals X2 and Y1 are measured.

That is, in the second embodiment, the power supply VDD is connectable to the terminal Y2 and GND is connectable to the terminal X1.

Next, at step S53, the pressing parameter XZ21NP is calculated by the following expression.

$$XZ21NP=(4096-Xp)/4096(Z2NP/Z1NP-1) \quad (8)$$

In addition, the pressing parameter XZ21 (hereinafter, referred to as XZ21PN) is calculated by the above expression (3).

Then, the average of XZ21PN and XZ21NP as described above is calculated, the calculated average is set at a final pressing parameter XZ21, and the pressing parameter calculation process ends.

On the other hand, at step S51, when xa<xb and ya<yb are determined (Yp1>Yp2 is determined based upon Yp1 and Yp2 measured at step S11), it is determined that the points A and B have the positional relationship illustrated in FIG. 23 and processing goes to step S54.

Figure 24A:
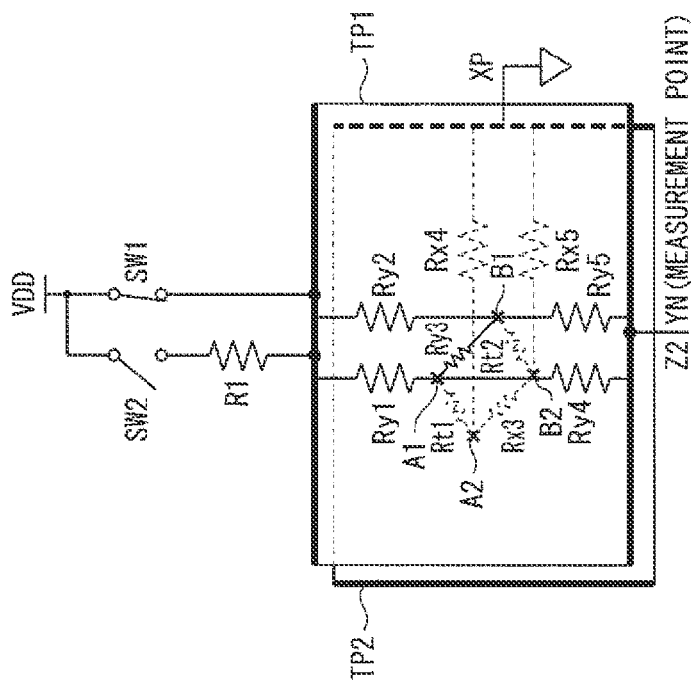
FIGS. 24A-24B are circuit diagrams when Z1PP and Z2PP are measured.
Figure 24B:
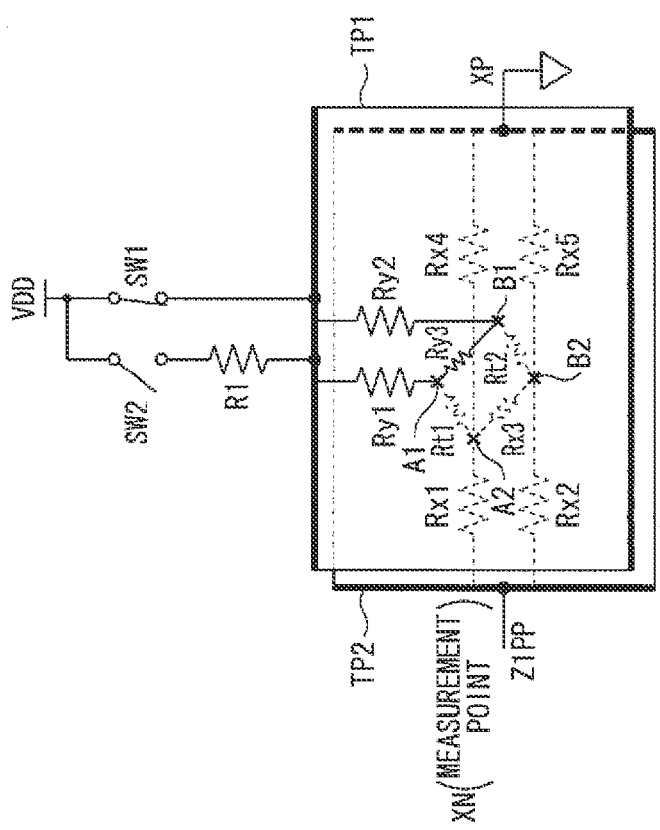

At step S54, the voltage XN (voltage Z1PP) in the state illustrated in FIG. 24A and the voltage YN (voltage Z2PP) in the state illustrated in FIG. 24B are acquired. That is, the voltage of the power supply VDD is directly applied to the terminal Y1, and the terminal X1 is connected to ground. Then, in this state, the voltage levels of the terminals X2 and Y2 are measured.

Next, at step S55, the pressing parameter XZ21PP is calculated by the following expression.

$$XZ21PP=(4096-Xp)/4096(Z2PP/Z1PP-1) \quad (9)$$

In addition, XZ21PP calculated by the above expression (9) is set to the final pressing parameter XZ21, and the pressing parameter calculation process ends.

(Operations)

Next, operations in the second embodiment of the present invention will be described.

Figure 21:
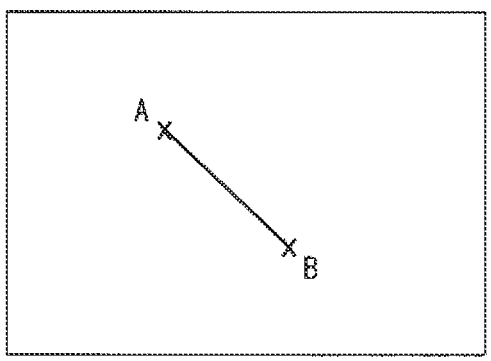
FIG. 21 is a view illustrative of a state of a touch input point when xa<xb and ya>yb are satisfied.

It is assumed that that the two points A and B illustrated in FIG. 21 are being touched currently. In this case, R_XP0–R_XP>D_XY is satisfied (step S13 in FIG. 5: Yes), and the controller 10 determines the two-point touch. Subsequently, the controller 10 performs the pressing parameter calculation process illustrated in FIG. 20.

In this situation, since xa<xb and ya>yb are satisfied (step S51: Yes), the average of XZ21 (XZ21PN) calculated by the above expression (3) and XZ21NP calculated by the above expression (8) is calculated as the final pressing parameter XZ21.

When the two points A and B illustrated in FIG. 21 are touched, the relationship between a resistance Ry4 and a resistance Ry5 on the touch panel TP1 satisfies Ry4>Ry5. In addition, the relationship between a resistance Rx4 and a resistance Rx5 on the touch panel TP2 satisfies Rx4>Rx5. Accordingly, the voltages Z1 and Z2 used for calculation of XZ21PN in the above expression (3) are more susceptible to influence of the point B than to the point A.

Therefore, XZ21PN has a value greatly influenced by the contact resistance value of the point B. In other words, XZ21PN is considered to be a pressing parameter that is higher in the degree of correlation with the contact resistance value (pressing force) of the point B than that with the contact resistance value (pressing force) of the point A.

When the contact resistance values of the point A and the point B are almost the same, XZ21PN calculated by the above expression (3) is approximately proportional to the actual contact resistance value Rt, same as the first embodiment as described above. For this reason, in this case, it is possible to calculate the distance between two points accurately, by using the XZ21PN as the pressing parameter XZ21.

However, when the contact resistance value is different between the point A and the point B, the accuracy is higher in the case where the average of XZ21PN and XZ21NP is used than that in the case where XZ21PN is used without change.

XZ21NP is a value calculated based upon the voltage XN (voltage Z1NP) in the state illustrated in FIG. 22A and the voltage YP (voltage Z2NP) in the state illustrated in FIG. 22B, and is a value greatly influenced by the contact resistance value of the point A. Accordingly, it is possible to acquire the average value of the point A and the point B by calculating the average of XZ21PN greatly influenced by the contact resistance value of the point B and XZ21NP greatly influenced by the contact resistance value of the point A. That is, acquirable is the pressing parameter XZ21 having almost the same influence of the contact resistance values of the point A and the point B. This results in a more accurate distance between two points.

On the other hand, while the two points A and B illustrated in FIG. 23 are being touched, xa<xb and ya<yb are satisfied (step S51: No). Therefore, XZ21PP calculated by the above expression (9) is calculated as the final pressing parameter XZ21.

While the two points A and B are being touched as illustrated in FIG. 23, the relationship between the resistance Ry4 and the resistance Ry5 on the touch panel TP1 satisfies Ry4>Ry5. In addition, the relationship between the resistance Rx4 and the resistance Rx5 on the touch panel TP2 satisfies Rx4<Rx5. For this reason, the voltage Z1 used for the calculation of XZ21PN in the above expression (3) is susceptible to the influence of the contact resistance value of the point B, and the voltage Z2 is susceptible to the influence of that of the point A.

In this situation, when the moving direction of the touch input point does not change, XZ21PN calculated by the above expression (3) is a value correlated with the actual contact resistance value Rt. For this reason, in this case, XZ21PN can be used for the gesture determination as the pressing parameter XZ21.

However, as the susceptible points are different between the voltage Z1 and the voltage Z2, it is desirable that XZ21PP is used instead of XZ21PN in order to improve the gesture determination and the calculation accuracy of the distance between two points.

XZ21PP is a value calculated by the voltage XN (voltage Z1PP) in the state illustrated in FIG. 24A and the voltage YN (voltage Z2PP) in the state illustrated in FIG. 24B. XZ21PP is susceptible to the influence of the point A, but is equally susceptible in the voltage Z1PP and the voltage Z2PP. Accordingly, it is possible to improve the calculation accuracy of the distance between two points when XZ21PP is used as the pressing parameter XZ21, as compared to the case where XZ21PN is used without change.

(Effects)

As described above, in the above second embodiment, the distance between two points is corrected by use of the pressing parameter having almost the same degree in correlation between the respective pressing forces, in consideration of the influence of the contact resistances at respective points when two points are touched. It is thus possible to calculate the distance between two points with higher accuracy.

(Applications)

Specifically, in the above second embodiment, the description has been given to the case where XZ21PP is used as the pressing parameter XZ21, when xa<xb and ya<yb are satisfied. However, XZ21NN in which the electrodes are exchanged is calculated, so that the average between XZ21NN and XZ21PP can be set to the final pressing parameter XZ21. In this manner, the average between XZ21NN susceptible to the influence of the point B and XZ21PP susceptible to the influence of the point A is calculated so that the calculation accuracy of the distance between two points can be improved.

Third Embodiment

Next, a description will be given of a third embodiment. In the third embodiment, the distance between two points is calculated by use of voltages Xp21, Yp21, RXp21, and RYp21, whereas in the above-described first and second embodiments, the distance between two points is calculated by use of the voltages R_XP0, R_YP0, R_XP, and R_YP.

(Configuration)

FIG. 25 is a circuit diagram illustrative of a configuration of the touch panel apparatus in the third embodiment of the present invention.

The touch panel apparatus has a similar configuration to that of the touch panel apparatus illustrated in FIG. 1 except that a switch SW7 and a switch SW8 are provided. Hence, herein, the description of the different configuration will be described mainly.

One end of the switch SW7 is connected to the terminal Y1 of the touch panel TP1, and the other end thereof is connected to the terminal Y2 of the touch panel TP1. Additionally, one end of the switch SW8 is connected to the terminal X1 of the touch panel TP2, and the other end thereof is connected to the terminal X2 of the touch panel TP2.

The controller 10 controls the opening and closing states of these switches SW7 and SW8, respectively.

The controller 10 controls the opening and closing of the switches SW1 to SW8, and acquires voltages XP, XN, YP, and YN generated at the terminals X1, X2, Y1, and Y2, respectively, in a prescribed connecting state. Herein, the controller 10 is provided with an AD converter, not illustrated, and converts the measured voltage to digital data.

Then, the controller 10 determines whether or not two points are touched on the touch panel TP based upon the voltage values that have been acquired. The controller 10 also detects and outputs the touched position (X coordinate, Y coordinate), when one point is touched. The controller 10 detects and outputs the central coordinates (X coordinate, Y coordinate) of the two points, the distance between the two points (X direction distance, Y direction distance), and directions of the two points, when the two points are touched.

Figure 26:
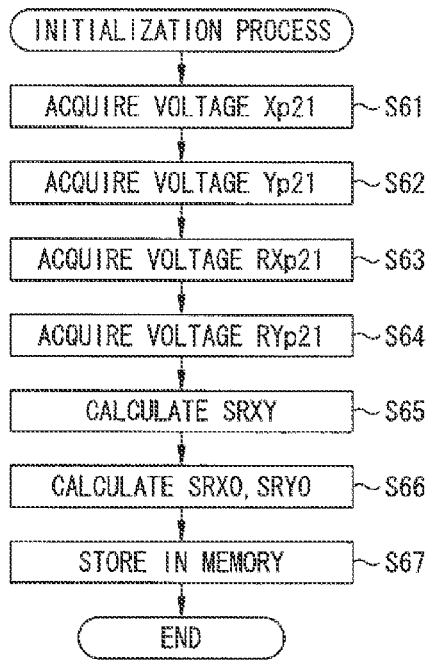
FIG. 26 is a flowchart illustrative of an initialization process procedure performed by a controller 10 according to the third embodiment.

In the third embodiment, the controller 10 does not perform the initialization process illustrated in FIG. 2, but performs an initialization process illustrated in FIG. 26 with one point on the touch panel TP being touched.

Figure 27:
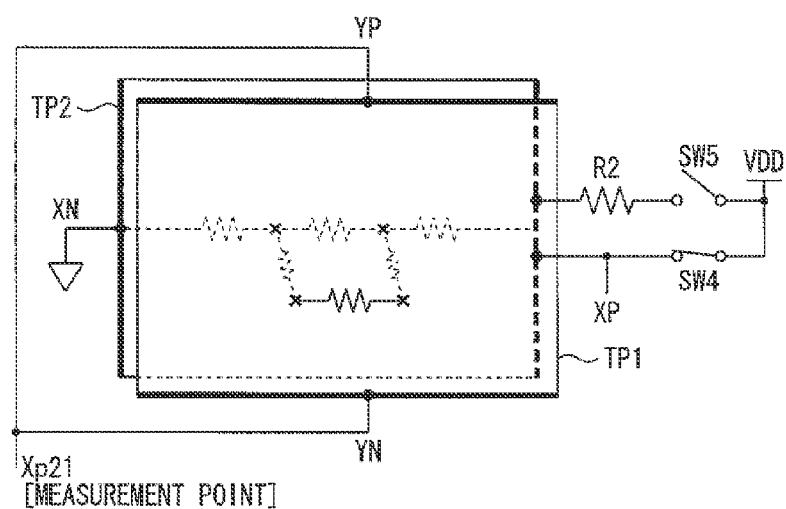
FIG. 27 is a circuit diagram when Xp21 is measured.

Firstly, at step S61, the voltage YP (voltage Xp21) of the terminal Y1 in the state illustrated in FIG. 27 is acquired. That is, the switches SW4, SW6, and SW7 are controlled to be in the closed state and the other switches are controlled to be in the open state, so that the voltage of the power supply VDD is applied between the terminals X1 and X2 and a short-circuit state is created with the terminals Y1 and Y2 connected. Then, the voltage level of the terminal Y1 in this state is measured. Specifically, FIG. 27 illustrates a circuit configuration between the terminals X1 and X2 when the two points are touched.

Figure 28:
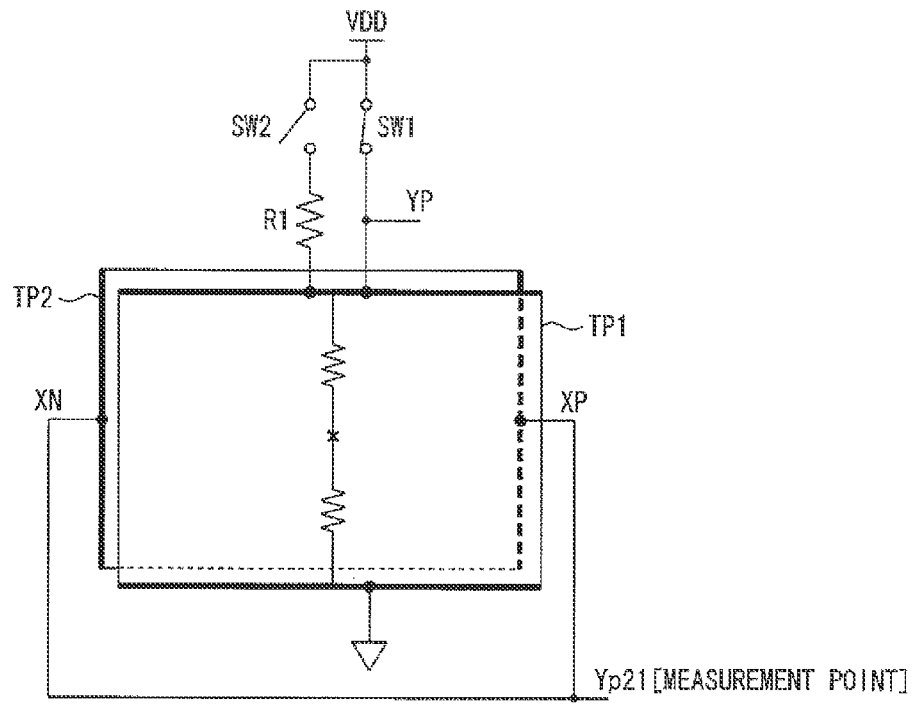
FIG. 28 is a circuit diagram when Yp21 is measured.

Next, at step S62, the voltage XP (voltage Yp21) of the terminal X1 in the state illustrated in FIG. 28 is acquired. That is, the switches SW1, SW3, and SW8 are controlled to be in the closed state and the other switches are controlled to be in the open state, so that the voltage of the power supply VDD is applied between the terminals Y1 and Y2 and a short-circuit state is created with the terminals X1 and X2 connected. Then, the voltage level of the terminal X1 in this state is measured. Specifically, FIG. 28 illustrates a circuit configuration between the terminals Y1 and Y2 when the one point is touched.

Figure 29:
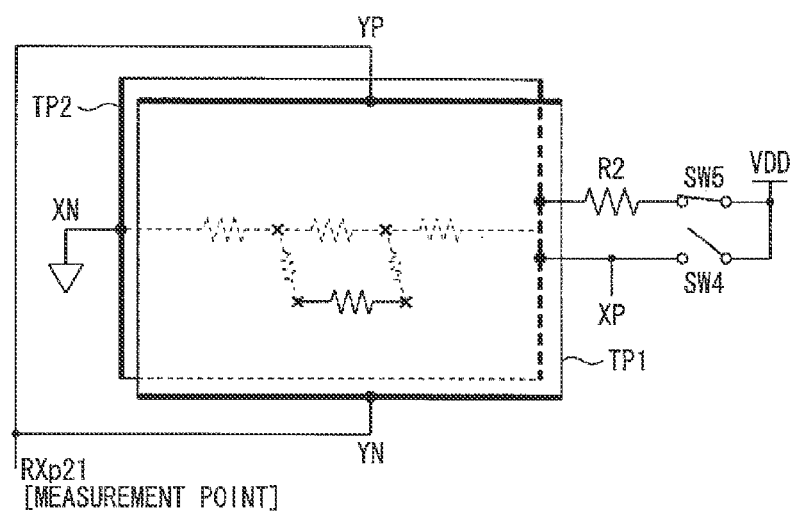
FIG. 29 is a circuit diagram when RXp21 is measured.

At step S63, the voltage YP (voltage RXp21) of the terminal Y1 in the state illustrated in FIG. 29 is acquired. That is, in comparison with the state of FIG. 27, the switch SW4 is controlled to be in the open state and the switch SW5 is controlled to be in the closed state, so that the voltage of the power supply VDD is applied between the terminals X1 and X2 through the resistance R2 and a short-circuit state is created with the terminals Y1 and Y2 connected. Then, the voltage level of the terminal Y1 in this state is measured. Specifically, FIG. 29 illustrates a circuit configuration between the terminals X1 and X2 when the two points are touched.

Figure 30:
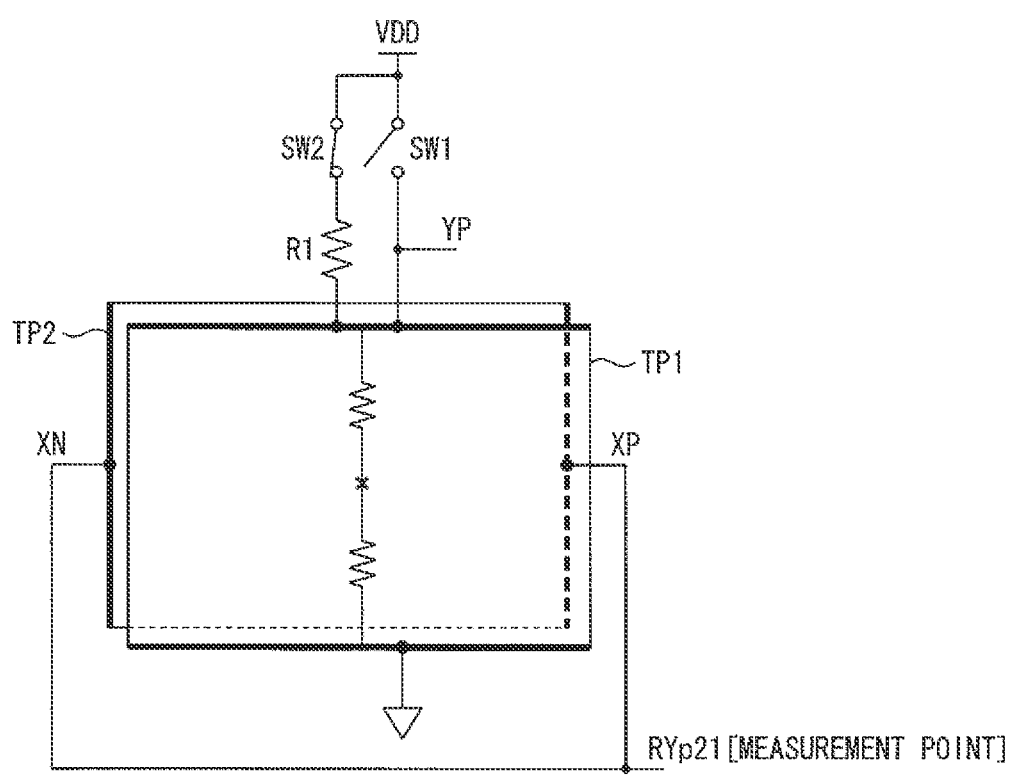
FIG. 30 is a circuit diagram when RYp21 is measured.

Next, at step S64, the voltage XP (voltage RYp21) of the terminal X1 in the state illustrated in FIG. 30 is acquired. That is, in comparison with the state of FIG. 28, the switch SW1 is controlled to be in the open state and the switch SW2 is controlled to be in the closed state, so that the voltage of the power supply VDD is applied between the terminals Y1 and Y2 through the resistance R1 and a short-circuit state is created with the terminals X1 and X2 connected. Then, the voltage level of the terminal X1 in this state is measured. Specifically, FIG. 30 illustrates a circuit configuration between the terminals Y1 and Y2 when the one point is touched.

At step S65, SRXY is calculated by the following expression, based upon the voltages Xp21, Yp21, RXp21, and RYp21 acquired at the steps S61 to S64, respectively.

$$SRXY = 4096 \cdot (RXp21 + RYp21)/(Xp21 + Yp21) \quad (10)$$

Specifically, the above expression (10) is a calculation expression in a case of 12 bits ($2^{12}=4096$).

At step S66, SRX0 is calculated by the following expression, based upon the voltage Xp21 acquired at the step S61 and the voltage RXp21 acquired at the step S63.

$$SRX0 = 4096 \cdot RXp21/Xp21 \quad (11)$$

Next, SRY0 is calculated by the following expression, based upon the voltage Yp21 acquired at the step S62 and the voltage RYp21 acquired at the step S64.

$$SRY0 = 4096 \cdot RYp21/Yp21 \quad (12)$$

Then, at step S67, SRX0 and SRY0 that are a value calculated at the step S66 is stored in a memory (not illustrated), and the initialization process ends.

In addition, the controller 10 performs the touch process illustrated in FIG. 31 instead of the touch process illustrated in FIG. 5, when the touch panel TP is touched.

Firstly, at step S71, various types of data are acquired. In detail, the voltages Xp21, Yp21, RXp21, and RYp21 are acquired.

The voltage Xp21 is a voltage YP measured in the state illustrated in FIG. 27, and the voltage Yp21 is a voltage XP measured in the state of FIG. 28. In addition, the voltage RXp21 is a voltage YP measured in the state illustrated in FIG. 29, and the voltage RYp21 is a voltage XP measured in the state of FIG. 30.

Then, processing goes to step S72, and DXY is calculated by the following expression based upon the respective voltages acquired at step S71 and SRXY stored in the memory.

$$DXY = SRXY \cdot (Xp21 + Yp21)/4096 - (RXp21 + RYp21) \quad (13)$$

At step S73, it is determined whether or not DXY calculated at the step S72 is greater than a preset determination threshold Dual_DXY. SRXY is a constant value when one point is touched, and has a smaller value when two points are touched than the value when one point is touched. Therefore, DXY is 0 when one point is touched, and has a greater value than 0 when two points are touched. Hence, the determination threshold Dual_DXY is set to 0 or a value greater than 0 having a predefined margin.

Then, DXY<=Dual_DXY is satisfied, one point touch is determined and processing goes to step S74. The voltages Xp21 and Yp21 acquired at the step S71 are output as XY coordinates of the touched position, and then the touch process ends.

On the other hand, when DXY>Dual_DXY is satisfied, two point touch is determined and processing goes to step S75. At step S75, the voltage Yp1 is acquired. The voltage Yp1 is the voltage XP measured in the state illustrated in FIG. 32. That is, in comparison with the state illustrated in FIG. 4, the switch SW2 is controlled to be in the open state, the switches SW1 and SW3 are controlled to be in the closed state, and the other switches are controlled to be in the open state, so that the voltage level of the terminal X1 of the other panel is measured with the voltage of the power supply VDD being applied between the terminals Y1 and Y2.

Next, processing goes to step S76, and whether or not the voltage Yp21 acquired at the step S71 is greater than the voltage Yp1 acquired at the step S75. Then, when Yp21>Yp1 is satisfied, processing goes to step S77, and when Yp21<=Yp1 is satisfied, processing goes to step S79 to be described later. At step S77, "+1" is set to the information dY indicating the directions of two points and processing goes to step S78.

At step S78, the voltages Z1 and Z2 are acquired, and then processing goes to step S81 to be described later. The voltages Z1 and Z2 is the voltage XP measured in the state illustrated in FIG. 33A and the voltage YN measured in the state illustrated in FIG. 33B, respectively. That is, the switches SW1 and SW6 are controlled to be in the closed state, and the other switches are controlled to be in the open state, so that the voltage of the power supply VDD is applied to the terminal Y1 and the terminal X2 is connected to ground. Then, in this state, the voltage levels of the terminals X1 and Y2 are measured. Herein, FIG. 33 illustrates a circuit configuration of the respective terminals when the two points A and B are touched. A1 and B1 are touch input points on the touch panel TP1, whereas A2 and B2 are touch input points on the touch panel TP2.

At step S79, "−1" is set to the information dY indicating the directions of two points and processing goes to step S80.

Figures 34A, 34B:
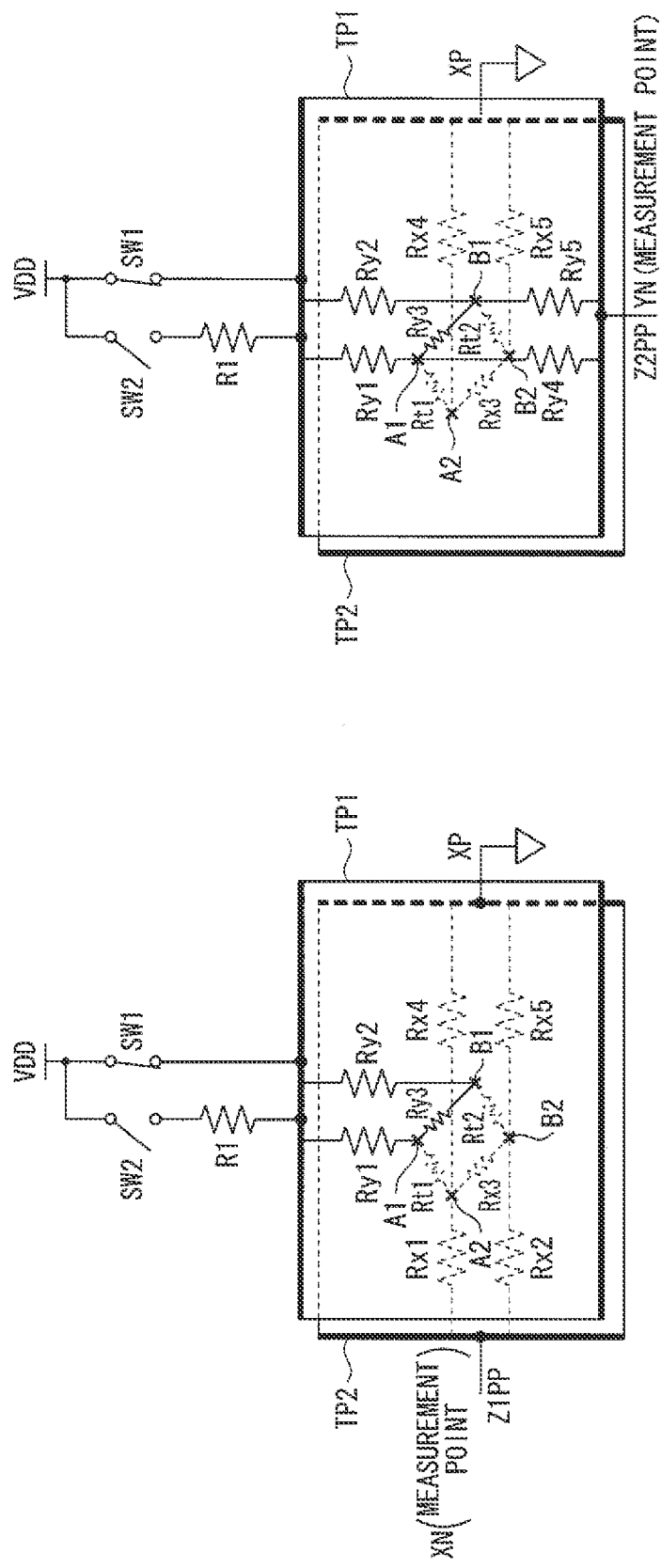
FIGS. 34A-34B are circuit diagrams when Z1PP and Z2PP are measured.

At step S80, the voltages Z1PP and Z2PP are acquired, and then processing goes to step S81. The voltages Z1PP and Z2PP is the voltage XN measured in the state illustrated in FIG. 34A and the voltage YN measured in the state illustrated in FIG. 34B, respectively. That is, the voltage levels of the terminals X2 and Y2 are measured in a state where the voltage of the power supply VDD is directly applied to the terminal Y1 and the terminal X1 is connected to ground. Then, the voltages Z1PP and Z2PP measured in this manner are set as the voltages Z1 and Z2, respectively. Herein, FIG. 34 illustrates a circuit configuration of the respective terminals when the two points A and B are touched. A1 and B1 are touch input points on the touch panel TP1, whereas A2 and B2 are touch input points on the touch panel TP2.

When the coordinates of the two points are set to (xa, ya) and (xb, yb) (where xa<xb is established), (xa, yb), (xb, ya), in which Y coordinates are exchanged, cannot be distinguished from each other by the central coordinates of the two points and the information of the distance between two points. In the circuit of FIG. 32, since the voltage of XP (voltage Yp1) is susceptible to the influence of yb, when Yp21>Yp1 is satisfied, ya>yb is determined, and when Yp21<Yp1 is satisfied, ya<yb is determined.

That is, when xa<xb and ya>yb are satisfied, dY=+1 is set, whereas when xa<xb and ya<yb are satisfied, dY=−1 is set.

At step S81, the pressing parameter XZ21 is calculated. The pressing parameter XZ21 is a parameter having a correlation with the pressing force of the touch input point, and as the pressing force is greater, the parameter has a smaller value. Herein, the pressing parameter XZ21 is calculated by the following expression.

$$XZ21 = Xp21/4096(Z2/Z1 - 1) \quad (14)$$

Next, processing goes to step S82, it is determined whether or not the pressing parameter XZ21 calculated at the step S81 is smaller than the preset determination value D_XZ21. Then, when XZ21>=D_XZ21 is satisfied, it is determined that a constant pressure is not applied onto the touch input point, and the touch process ends without change. On the other hand, when XZ21<D_XZ21 is satisfied, it is determined that a constant pressure is applied onto the touch input point, and processing goes to step S83.

At step S83, the distance between two points in X direction XDual is calculated by the following expression.

$$XDual = A \cdot (SRX0 - 4096 \cdot RXp21/Xp21 - B) \cdot (XZ21 + C) + D \quad (15)$$

where A, B, C, and D are preset constant numbers, respectively.

In this manner, the two-point distance reference value A·(SRX0−4096·RXp21/Xp21−B), which is calculated based upon difference between SRX0 that is a ratio between the voltage Xp21 and the voltage RXp21 when one point is touched and the ratio between the voltage Xp21 and the voltage RXp21 when two points are touched, is corrected by a correction coefficient (XZ21+C) to be set together with the pressing parameter XZ21, so that the distance between two points in X direction XDual is calculated.

Next, at step S84, the distance between two points in Y direction YDual is calculated by the following expression.

$$YDual=A\cdot(SRY0-4096\cdot RYp21/Yp21-B)\cdot(XZ21+C)+D \quad (16)$$

In this manner, the two-point distance reference value A·(SRY0−4096·RYp21/Yp21−B), which is calculated based upon difference between SRY0 that is a ratio between the voltage Yp21 and the voltage RYp21 when one point is touched and the ratio between the voltage Yp21 and the voltage RYp21 when two points are touched, is corrected by a correction coefficient (XZ21+C) to be set together with the pressing parameter XZ21, so that the distance between two points in Y direction YDual is calculated.

Then, at step S85, the central coordinates (Xp21, Yp21) of the two points, the distances between two points XDual and YDual, and the information dY indicating the directions of two points are output, and the touch process ends.

As described heretofore, the distances between two points XDual and YDual are calculated by use the fact that RXp21/Xp21 or RYp21/Yp21 changes according to the distance between two points.

However, in the above-described process, an averaging process or the like may be performed when acquiring various types of data. As the averaging process, for example, six data are acquired. After the maximum value and minimum value are deleted from the six data, the average is calculated from the remaining four data. This improves the reliability of the measured data.

In addition, in FIG. 31, step S71 (in particular, FIG. 27 and FIG. 28) corresponds to a first voltage detector, and step S71 (in particular, FIG. 29 and FIG. 30) corresponds to a second voltage detector. Furthermore, steps S72 and S73 correspond to a two-point touch detector, and steps S83 and S84 correspond to a two-point distance detector. Moreover, steps S76 to S81 correspond to a pressing force detector.

(Operations)

Next, operations of the third embodiment of the present invention will be described.

Now, the operator is touching two points on the touch panel TP. In this situation, when the distance between two points is relatively short, RXp21/Xp21 or RYp21/Yp21 when the two points are touched has a value relatively closer to RXp21/Xp21(=SRX0) or RYp21/Yp21(=SRY0) when one point is touched.

Therefore, the controller 10 calculates the distances between two points XDual and YDual to a relatively small value, based upon the above expressions (15) and (16) (steps S83 and S84).

RXp21/Xp21 or RYp21/Yp21 at the two-point touch has a smaller value than SRX0 or SRY0, as the distance between two points is longer. Therefore, when the distance between two points is relatively long, the controller 10 calculates the distances between two points XDual and YDual to a relatively great value based upon the above expressions (15) and (16) (steps S83 and S84).

As described heretofore, it is possible to calculate the distance between two points appropriately by use of the fact that a voltage ratio RXp21/Xp21 or RYp21/Yp21 changes according to the distance between two points.

In addition, the distance between two points is corrected according to the pressing force of the touch input by use of the pressing parameter XZ21. In this situation, a measuring method of the voltages Z1 and Z2 is changed according to the directions of the two points, for calculating the pressing parameter XZ21.

When the directions of the two points dY=+1 is satisfied, that is when xa<xb and ya>yb are satisfied, the voltages XP and YN measured in a connecting state of FIG. 33 are both susceptible to the influence of the contact resistance value of the point B more than that of the point A. On the other hand, when the directions of the two points dY=−1 is satisfied, that is when xa<xb and ya<yb are satisfied, the voltage XP measured in the connecting state of FIG. 33A is susceptible to the influence of the contact resistance value of the point B, whereas the voltage YN measured in the connecting state of FIG. 33B is susceptible to the influence of the contact resistance value of the point A. In this manner, the calculation accuracy for the distance between two points cannot be improved when the voltages are susceptible to the influence of different points.

Therefore, when dY=−1 is satisfied, the voltages XN and YN measured in the connecting state of FIG. 34 are used as the voltages Z1 and Z2, respectively. When the directions of the two points dY=−1 is satisfied, that is xa<xb and ya<yb are satisfied, the voltages XN and YN measured in the connecting state of FIG. 34 are values both susceptible to the influence of the contact resistance value of the point A.

In this manner, it is possible to calculate the pressing parameter in consideration of the influence of the contact resistances of the respective points when two points are touched, by changing the measuring method of the voltages Z1 and Z2 according to the directions of the two points. As a result, it is possible to improve the calculation accuracy for the distance between two points.

Specifically, herein, the description has been given of the case where the pressing parameter XZ21 is calculated based upon the voltages XP and YN (voltages Z1 and Z2) measured in the connecting state of FIG. 33, when dY=+1 is satisfied. However, the final pressing parameter XZ21 may be the average of the pressing parameter XZ21 and the pressing parameter XZ21NP calculated based upon the voltages XN and YP (voltages Z1NP and Z2NP) measured in the state where the voltage of the power supply VDD is directly applied to the terminal Y2 and the terminal X1 is connected to ground, in comparison with the state of FIG. 33.

In addition, likewise, when dY=−1 is satisfied, the final pressing parameter XZ21 may be the average of the pressing parameter XZ21 calculated based upon the voltages XN and YN (voltages Z1PP and Z2PP) measured in the connecting state of FIG. 34 and the pressing parameter XZ21NN calculated based upon the voltages XP and YP (voltages Z12NN and Z2NN) measured in the state where the voltage of the power supply VDD is directly applied to the terminal Y2 and the terminal X2 is connected to ground, in comparison with the state of FIG. 34.

In this manner, it is possible to further improve the calculation accuracy of the distance between two points by calculating the average of the pressing parameter susceptible to the point A and the pressing parameter susceptible to the point B.

(Effects)

As described above, in the above third embodiment, the distance between two points is detected by use of the fact that the voltage ratio RXp21/Xp21 or RYp21/Yp21 changes according to the distance between two points. It is therefore possible to detect the distance between two points appropriately. Moreover, the distance between two points is detected by use of the measured voltage for use in the coordinate detection or two-point touch determination. This eliminates the necessity of newly measuring the voltage for detecting the distance between two points. Accordingly, the number of voltage measurements can be reduced.

(Applications)

Specifically, in the above third embodiment, same as the above-described first embodiment, it is possible to determine the gesture (scaling up, shown in FIG. 13A, scaling down, shown in FIG. 13B, and rotation, shown in FIG. 13C) of the two-point touch, by use of the distances between two points XDual and YDual.

(Modifications)

In addition, in the above first and second embodiments, the description has been given of the case of employing the method of determining, as a two-point touch determining unit, whether or not the two-point touch is performed according to whether or not the difference between the voltage R_XP and the reference voltage R_XP0 is greater than the determination threshold value D_XY. However, another method of utilizing the fact that the resistance value between the electrode terminals becomes smaller by the two-point touch may be employed.

Furthermore, in each of the above embodiments, the description has been given of the case where the voltages Z1 and Z2 are measured and the pressing parameter XZ21 having a correlation with the pressing force is calculated. However, a sensor composed of a piezoelectric element or the like may be provided and the pressing force of the touch input may be detected by the sensor.

INDUSTRIAL AVAILABILITY

With a touch panel apparatus according to the present invention, it is possible to detect the distance between two points when the two points are touched on the touch panel. Therefore, the touch panel apparatus can be provided for recognizing the operation that matches the operator's intention, and is useful.

Additionally, with a method of detecting the distance between the touch input points on the touch panel according to the present invention, when two points are touched on the touch panel, the distance between the two points can be detected with accuracy according to the pressing force, and the method is useful.

REFERENCE SIGNS LIST

10 controller
11 LCD module
TP1, TP2 touch panel
X1, X2 terminal (X direction)
Y1, Y2 terminal (Y direction)
SW1-SW8 switch

The invention claimed is:

1. A touch panel apparatus comprising:
a touch panel having two resistance films, each having a pair of electrode terminals at edge side portions opposing each other, the two resistance films closely opposing each other to be capable of being in contact with each other so that the pair of electrode terminals are vertically perpendicular to each other;
a between-terminal resistance measuring circuit designed to measure a resistance value of the pair of electrode terminals;
a two-point touch determining circuit designed to determine whether or not two points are touched on the touch panel based upon the resistance value measured by the between-terminal resistance measuring circuit;
a pressing force detector adapted to detect a pressing force of a touch input when the two-point touch determining circuit determines that the two points are touched;
a two-point distance detector adapted to detect a distance between the two points based upon the resistance value measured by the between-terminal resistance measuring circuit and the pressing force measured by the pressing force detector, when the two-point touch determining circuit determines that the two points are touched;
wherein the two-point distance detector comprises:
a reference value calculating circuit designed to calculate a reference value of the distance between the two points based upon a difference between the resistance value measured by the between-terminal resistance measuring circuit when the touch panel is not touched and the resistance value measured by the between-terminal resistance measuring circuit when the touch panel is touched; and
a correcting circuit designed to increase the reference value of the distance between the two points calculated by the reference value calculating circuit, as the pressing force detected by the pressing force detector is smaller.

2. A touch panel apparatus comprising,
a touch panel composed of two resistance films, each having a pair of electrode terminals at edge side portions opposing each other, the two resistance films closely opposing each other to be capable of being in contact with each other so that the pair of electrode terminals are vertically perpendicular to each other;
a first voltage detector adapted to, with a power-supply voltage being applied between the pair of the electrode terminals of one of the resistance films and with the pair of the electrode terminals of the other of the resistance films being short-circuited, detect a voltage of any one of the pair of electrode terminals of the other of the resistance films;
a second voltage detector adapted to, with a power-supply voltage being applied, through a resistance, between the pair of the electrode terminals of one of the resistance films and with the pair of the electrode terminals of the other of the resistance films being short-circuited, detect a voltage of any one of the pair of electrode terminals of the other of the resistance films;
a two-point touch determining circuit designed to determine whether or not two points are touched on the touch panel based upon a ratio of the voltage detected by the first voltage detector and the voltage detected by the second voltage detector;
a pressing force detector adapted to detect a pressing force of a touch input when the two-point touch determining circuit determines that the two points are touched; and
a two-point distance detector adapted to detect a distance between the two points based upon the ratio of the voltage detected by the first voltage detector and the voltage detected by the second voltage detector, and the pressing force measured by the pressing force detector, when the two-point touch determining circuit determines that the two points are touched.

3. The touch panel apparatus according to claim 2, wherein the two-point distance detector comprises:

a reference value calculating circuit designed to calculate a reference value of the distance between the two points based upon a difference between the ratio of the voltage detected by the first voltage detector and the voltage detected by the second voltage detector when one point is touched on the touch panel, and the ratio of the voltage detected by the first voltage detector and the voltage detected by the second voltage detector when the two points are touched on the touch panel; and a correcting circuit designed to increase the reference value of the distance between the two points calculated by the reference value calculating circuit, as the pressing force detected by the pressing force detector is smaller.

4. The touch panel apparatus according to any one of claims 1, 2 and 3, wherein when the two-point touch determining circuit determines that the two points are touched, the pressing force detector detects a pressing parameter having a correlation with a pressing force of the touch input and having a same or a substantially same degree of the correlation with the pressing force of each point.

5. A method for detecting a distance between touch input points of a touch panel, the method comprising:

as a first voltage detecting step, with a power-supply voltage being applied between a pair of the electrode terminals arranged at edge side portions opposing each other in each of two resistance films in a touch panel, the two resistance films closely opposing each other to be capable of being in contact with each other so that the pair of electrode terminals are vertically perpendicular to each other, and with the pair of the electrode terminals of the other of the resistance films being short-circuited, detecting a voltage of any one of the pair of electrode terminals of the other of the resistance films;

as a second voltage detecting step, with a power-supply voltage being applied, through a resistance, between the pair of the electrode terminals of one of the resistance films and with the pair of the electrode terminals of the other of the resistance films being short-circuited, detecting a voltage of any one of the pair of electrode terminals of the other of the resistance films;

determining whether or not two points are touched on the touch panel based upon a ratio of the voltage detected by the first voltage detecting step and the voltage detected by the second voltage detecting step;

detecting a pressing force of a touch input when the two-point touch determining step determines that the two points are touched; and detecting a distance between the two points based upon the ratio of the voltage detected by the first voltage detecting step and the voltage detected by the second voltage detecting step, and the pressing force measured by the pressing force detecting step, when the two-point touch determining step determines that the two points are touched.

* * * * *